United States Patent [19]

Carr et al.

[11] Patent Number: 5,540,834
[45] Date of Patent: Jul. 30, 1996

[54] SYNTHESIS OF POROUS INORGANIC PARTICLES BY POLYMERIZATION-INDUCED COLLOID AGGREGATION (PICA)

[75] Inventors: Peter W. Carr; Alon V. McCormick, both of Minneapolis, Minn.; Michael J. Annen, Monroeville, Pa.; Lifang Sun, Kingsport, Tenn.; Jason R. Brown, Minneapolis, Minn.

[73] Assignee: Regents of the University of Minnesota, Minneapolis, Minn.

[21] Appl. No.: 294,374

[22] Filed: Aug. 23, 1994

[51] Int. Cl.⁶ .................................................. B01D 15/08
[52] U.S. Cl. .................. 210/198.2; 210/502.1; 210/656; 502/439
[58] Field of Search ......................... 210/635, 656, 210/659, 198.2, 502.1; 502/400, 405, 407, 439

[56] References Cited

U.S. PATENT DOCUMENTS

| | | | |
|---|---|---|---|
| 3,782,075 | 1/1974 | Kirkland | 210/198.2 |
| 3,855,172 | 12/1974 | Iler et al. | 260/39 R |
| 3,892,580 | 7/1975 | Messing | 106/41 |
| 3,910,851 | 10/1975 | Messing | 252/455 R |
| 3,954,678 | 5/1976 | Marquiesse | 252/451 |
| 4,010,242 | 3/1977 | Iler et al. | 423/335 |
| 4,070,286 | 1/1978 | Iler | 210/198.2 |
| 4,105,426 | 8/1978 | Iler | 210/198.2 |
| 4,138,336 | 2/1979 | Mendel et al. | 210/198 |
| 4,389,385 | 6/1983 | Ramsey | 423/338 |
| 4,837,195 | 6/1989 | Cox | 210/198.2 |
| 4,874,518 | 10/1989 | Kirkland | 210/502.1 |
| 4,902,413 | 2/1990 | Stout | 210/198.2 |
| 4,986,908 | 1/1991 | Stout | 210/198.2 |
| 5,015,373 | 5/1991 | Carr et al. | 210/198.2 |
| 5,032,266 | 7/1991 | Kirkland | 210/198.2 |
| 5,108,595 | 4/1992 | Kirkland | 210/198.2 |
| 5,108,597 | 4/1992 | Funkenbusch et al. | 210/198.2 |
| 5,141,634 | 8/1992 | Carr et al. | 210/198.2 |
| 5,182,016 | 1/1993 | Funkenbusch et al. | 210/198.2 |
| 5,205,929 | 4/1993 | Carr et al. | 210/198.2 |
| 5,254,262 | 10/1993 | Funkenbusch et al. | 210/656 |
| 5,271,833 | 12/1993 | Funkenbusch et al. | 210/198.2 |

FOREIGN PATENT DOCUMENTS

| | | | |
|---|---|---|---|
| 0162716 | 5/1985 | European Pat. Off. | 210/198.2 |
| 0331283 | 1/1989 | European Pat. Off. | 210/198.2 |
| 0490226A1 | 6/1992 | European Pat. Off. | 210/198.2 |

OTHER PUBLICATIONS

M. Annen et al., "The Preparation of Porous Zirconia by Continuous Flow and Batch Processes", *Abstracts of Papers*, Fine Particle Society Meeting, Aug. 23–28 (1993) (Abstract Only).

M. Annen et al., "The Controlled Aggregation of Zirconia Colloids in the Presence of Urea–Formaldehyde Resins: Effect of the Rates of Polymerization and Polymer Adsorption on Secondary Particle Formation", *Abstracts of Papers*, AICHE Meeting, Nov. 7–12 (1993) (Abstract Only).

M. Annen et al., "The Controlled Aggregation of Colloids for the Preparation of Spherical, Porous Zirconia", *Abstracts of Papers*, AICHE Meeting, Nov. 7–12 (1993) (Abstract Only).

M. Annen et al., "Synthesis and Characterization of Porous Zirconia Supports for HPLC and Perfusion Chromatography", *Abstracts of Papers*, The Pittsburgh Conference, Abstract No. 900, Feb. 27–Mar. 4, (1994) (Abstract Only).

(List continued on next page.)

*Primary Examiner*—Ernest G. Therkorn
*Attorney, Agent, or Firm*—Mueting, Raasch, Gebhardt & Schwappach, P.A.

[57] ABSTRACT

The present invention provides improved methods for the preparation of porous inorganic particles. The methods involve combining an aqueous sol containing a colloidal dispersion of inorganic particles with a polymerizable organic material, polymerizing this material, and thereby forming aggregates of colloidal particles and polymer.

22 Claims, 26 Drawing Sheets

OTHER PUBLICATIONS

U. Bien–Vogelsang et al., "Synthesis of Stationary Phases for Reversed–Phase LC Using Silanization and Polymer Coating", *Chromatographia*, 19, 170–176 (1984).

J. A. Blackwell et al., "Ligand Exchange Chromatography of Free Amino Acids on Phosphated Zirconium Oxide Supports", *J. Liq. Chrom.*, 15, 727–751 (1992).

J. A. Blackwell et al., "Ligand Exchange Chromatography of Free Amino Acids and Proteins on Porous Microparticulate Zirconium Oxide", *J. Liq. Chrom.*, 15, 1487–1506 (1992).

J. A. Blackwell et al., "Ion– and Ligand–Exchange Chromatography of Proteins Using Porous Zirconium Oxide Supports in Organic and Inorganic Lewis Base Eluents", *J. Chromatogr.*, 596, 27–41 (1992).

J. A. Blackwell et al., "Fluoride–Modified Zirconium Oxide as a Biocompatible Stationary Phase for High–Performance Liquid Chromatography", *J. Chromatogr.*, 549, 549–75 (1992).

P. Carr, "Base Stable and Composite $ZrO_2$ Ceramic Supports for HPLC", *NSF Grant No.* CHE–9107029, Abstract, Dec. 1990.

P. Carr. "Base Stable and Composite Ceramic Supports for HPLC and Fluidized Bed Separation", *NIH Grant No.* GM45988, Abstract, Jun. 1990.

C. J. Dunlop et al., "Dextran Coated Zirconia–A Stable Biocompatible Stationary Phase for HPLC", *Abstracts of Papers*, The Pittsburgh Conference, Abstract No. 518P, Feb. 27–Mar. 4 (1994) (Abstract Only).

M. C. Flickinger et al., "Use of Zirconia Supports for Fluidized–Bed Separations of Proteins", *Abstracts of Papers*, The Pittsburgh Conference, Abstract No. 899, Feb. 27–Mar. 4 (1994) (Abstract Only).

M. Glavanovich et al., "Zirconia: An Easily Regenerable Chromatographic Support with Applications to Affinity Chromatography", *Abstracts of Papers*, 14th Minnesota Chromatography Forum, Abstract No. 18, May 4–6 (1992) (Abstract Only).

M. Glavanovich et al., "Easily Regenerable Affinity Chromatographic Zirconia–Based Support with Concanavalin A as a Model Ligand", *Anal. Chem.*, 66, 2584–2589 (1994).

R. K. Iler, "Coacervates of Polyvinyl Alcohol and Colloidal Silica," *J. Colloid Interface Sci.*, 51, 388–393 (1975).

B. J. Kellett et al., "Thermodynamics of Densification: I, Sintering of Simple Particle Arrays, Equilibrium Configurations, Pore Stability, and Shrinkage," *J. Amer. Ceram. Soc.*, 72(5), 725–734 (1989).

F. F. Lange, "Thermodynamics of Densification: II, Grain Growth in Porous Compacts and Relation to Densification," *J. Amer. Ceram. Soc.*, 72(5), 735–741 (1989).

C. F. Lorenzano–Porras et al., "Relationship between Pore Structure and Diffusion Tortuosity of $ZrO_2$ Colloidal Aggregates", *J. Coll. & Inter. Sci.*, 164, 1–8 (1994).

J. Nawrocki et al., "Chemistry of Zirconia and its use in Chromatography", *J. Chromat. A*, 657, 229–282 (1993).

M. P. Rigney, "The Development of Porous Zirconia as a Support for Reversed–Phase High–Performance Liquid Chromatography", University of Minnesota Dissertation, Analytical Chemistry (1989) pp. 1–269.

M. P. Rigney et al., "Preparation and Evaluation of a Polymer–Coated Zirconia Reversed–Phase Chromatographic Support", *J. Chromatogr.*, 484, 273–291 (1989).

W. A. Schafer et al., "Physical and Chemical Characterization of a Porous Phosphate–Modified Zirconia Substrate", *J. Chomatogr.*, 587, 137–147 (1991).

W. A. Schafer et al., "Chromatographic Characterization of a Phosphate–Modified Zirconia Support for Bio–Chromatographic Applications", *J. Chromatogr.*, 587, 149–160 (1991).

G. Schomburg et al., "Stationary Phases in High Performance Liquid Chromatography", *LC–GC*, 6, 36–50 (1987).

L. Sun et al., "Synthesis of Monodisperse Porous Zirconia Particles Optimized for HPLC", *Abstracts of Papers*, 14th Minnesota Chromatography Forum, Abstract No. 22, May 4–6, (1992) (Abstract Only).

L. Sun et al., "Polybutadiene–Coated Monodisperse Porous Zirconia Particles for the Separation of Peptides and Proteins", *Abstracts of Papers*, The Pittsburgh Conference, Abstract No. 1243, Mar. 8–12 (1993) (Abstract Only).

L. Sun et al., "Study of Irreversible Adsorption of Proteins on Polybutadiene–coated Zirconia", *Abstracts of Papers*, 15th Minnesota Chromatography Forum, Abstract No. 4, May 3–5 (1993) (Abstract Only).

L. Sun et al., "Mobile Phase Effects on the Recovery of Proteins from Polybutadiene–Coated Ceramic Supports", *Abstracts of Papers*, The Pittsbugh Conference, Abstract No. 372, Feb. 27–Mar. 3 (1994) (Abstract Only).

L. Sun et al., "Study of the Irreversible Adsorption of Proteins on Polybutadiene–Coated Zirconia", *J. Chroma A*, 658, 465–473 (1994).

L. Sun et al., "Synthesis of Porous Zirconia Spheres for HPLC by Polymer–Induced Colloid Aggregation (PICA)," *J. Colloid & Interface Sci.*, 163, 464–473 (1994).

U. Trudinger et al., "Porous Zirconia and Titania as Packing Materials for High–Performance Liquid Chromatography", *J. Chromatogr.*, 535, 111–125 (1990).

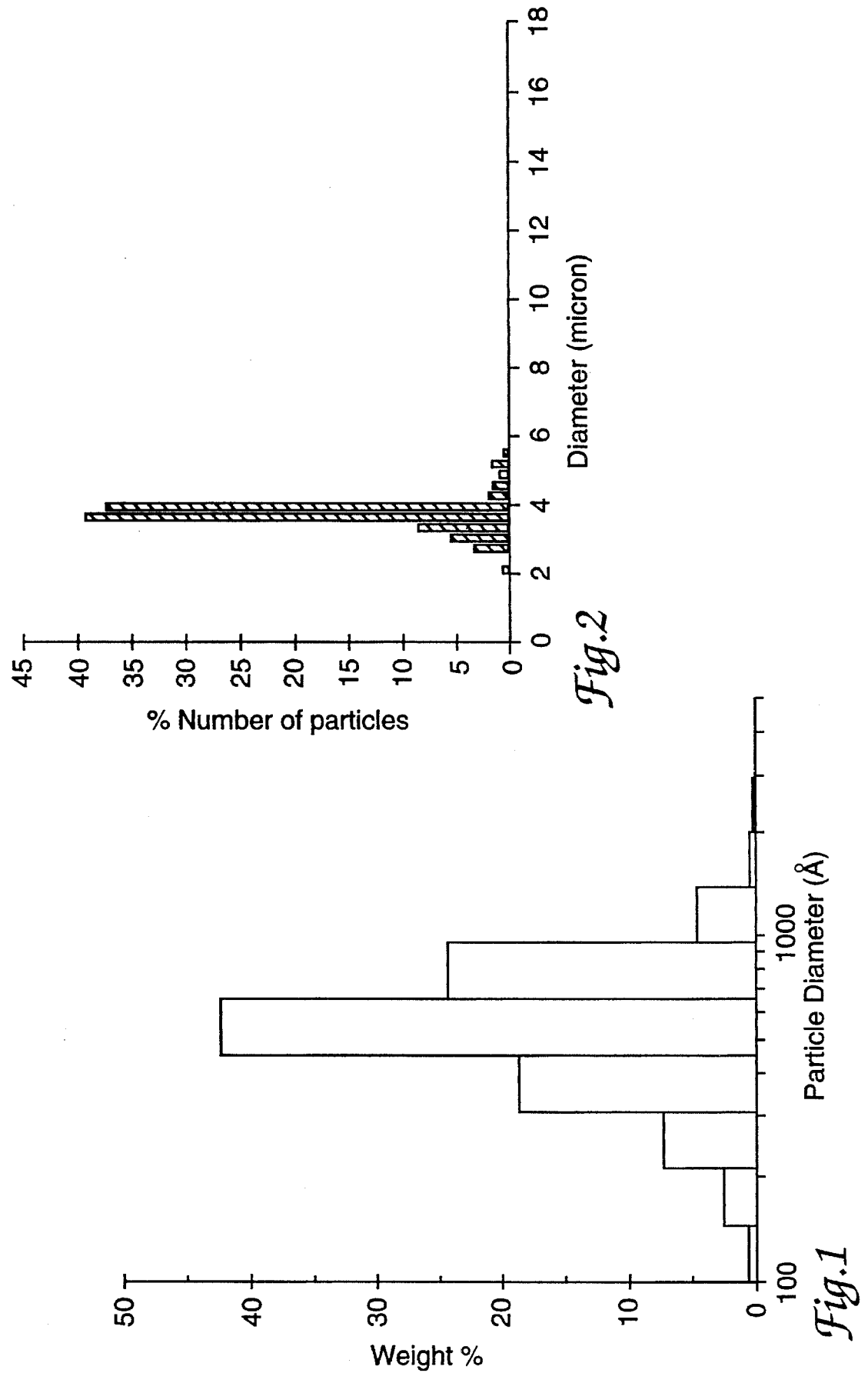

SYNTHESIS OF POROUS INORGANIC PARTICLES BY POLYMERIZATION-INDUCED COLLOID AGGREGATION (PICA)

STATEMENT REGARDING GOVERNMENT RIGHTS

The present invention was made with government support from the National Science Foundation, under Grant No. CHE-9107029, and from the National Institutes of Health, under Grant No. 5R0l-GM45988. The Government has certain rights in this invention.

BACKGROUND OF THE INVENTION

The preparation of porous silica and zirconia particles with narrow particle size distributions, i.e., monodisperse particles, have received a great deal of attention, particularly since they have proven to be a useful packing materials for high performance liquid chromatography (HPLC). Furthermore, zirconia ($ZrO_2$) has proven to be much more chemically stable at high pH (greater than about 13) than other inorganic HPLC column packings. See, for example, U.S. Pat. No. 5,015,373 (P. W. Carr et al.). For HPLC, the particles are preferably substantially spherical, generally uniform in size (preferably varying by only about 2 µm), have a particle size of about 0.5–15 µm (preferably about 3–10 µm), and have pores ranging from about 100 Å to 1000 Å in diameter.

Various colloid-aggregation processes have been used for the preparation of porous zirconia spheres. One such method, an oil emulsion method, involves mechanically dispersing micron-scale droplets of an aqueous zirconia sol in an oil phase. Simultaneous gelation of the colloids within the droplet and extraction of water from the droplets yields zirconia aggregates that are further strengthened by sintering. This method has produced a polydisperse collection of spheres ranging from about 0.5 µm to about 500 µm in diameter. See, for example, U.S. Pat. No. 5,015,373 (P. W. Carr et al.); and U. Trudinger, *Chromatogr.*, 535, 111 (1990). While surfactants can be used to help control the final particle size, zirconia spheres prepared by this method usually have a broad size distribution. Thus, size classification is mandatory to make these zirconia spheres useful for HPLC.

Techniques based on spray drying have also been used for the preparation of porous zirconia. See, for example, U.S. Pat. No. 5,015,373 (P. W. Carr et al.); and EP Pat. Appl. No. 0 490 226 A1 (1991). In this process a zirconia sol, which may contain a reactive binder, is forced through a nozzle. Droplets of zirconia solution are dried to yield rigid particles. This method has produced spheres ranging from about 1 µm to about 100 µm in diameter. Some size classification may be necessary to obtain particles of the desired diameter with a narrow size distribution, however.

Another method for the preparation of generally spherical, porous particles was first disclosed in U.S. Pat. No. 4,010,242 (Iler et al.). This method is referred to herein as "polymerization-induced colloid aggregation" (PICA) because polymer growth occurs along with colloid aggregation. It has also been referred to as coacervation or microencapsulation. In this method, urea and formaldehyde are mixed with an acidic colloidal sol. The urea and formaldehyde undergo acid-catalyzed polymerization, and the oligomer so formed adsorbs onto the surface of the colloids causing them to aggregate. See also, R. K. Iler, *J. Colloid Interface Sci.*, 51, 388 (1975). Though the mechanism of aggregation is not clear, it may proceed by the formation of polymer linkages between colloids.

The potential advantages of PICA over other colloid-aggregation methods are: (1) it can yield particles with a narrow particle size distribution; and (2) it is relatively easy to implement. However, the method disclosed in U.S. Pat. No. 4,010,242 (Iler et al.) does not provide consistent results, particularly for the preparation of unclustered, generally spherical, porous $ZrO_2$ particles. Thus, what is needed is a convenient synthesis method that will consistently yield appropriately porous and generally spherical particles, such as zirconia and silica particles, for example, with a narrow particle size distribution in relatively high yields. Also, what is needed is a synthesis method that allows greater control over the aggregation process and thereby tuning of the pore structure of the final particles.

SUMMARY OF THE INVENTION

Methods for producing inorganic particles with a narrow particle size distribution, which are useful as chromatographic packing materials for high performance liquid chromatography (HPLC), are provided. These methods are based on improvements in the polymerization-induced colloid aggregation (PICA) process first described in U.S. Pat. No. 4,010,242 (Iler et al.). These improved methods involve both continuous flow and batch processes, wherein an aqueous sol containing a colloidal dispersion of inorganic particles is combined with a polymerizable organic material. The polymerizable organic material polymerizes and adsorbs onto the colloids, entraining the colloids in the precipitation of the polymer and thus allowing the colloids to aggregate. Preferred processing parameters, e.g., temperature, reaction mixture composition, pH, and solvent polarity, for example, produce relatively high yields of generally spherical particles, i.e., spherules, having a porosity of about 5–60%, and a particle size of about 0.5–15 µm.

The PICA method of the present invention is advantageous because it yields particles of narrow size distribution and is relatively easy to implement. The continuous PICA method of the present invention not only yields particles of narrow size distribution, but it allows significant control of the reaction mixture composition. The continuous production of aggregates of narrow size distribution is economically important. It essentially eliminates the need for post-synthetic particle-size classification. Therefore, the product yield is generally higher, there is usually less waste generation, and the entire synthesis process is typically more economical. Control over the reaction mixture composition during aggregate synthesis results in control of the pore structure of the resulting spherical particles, i.e., spherules, after polymer removal. This control of the pore structure is important for the engineering of porous particles that can be used for a diverse array of applications.

The present invention provides a particularly preferred method for producing inorganic monodisperse particles, preferably $ZrO_2$ particles, that have a porosity of about 5–60%. This method involves the steps of:

(a) combining an aqueous sol comprising a colloidal dispersion of inorganic particles with a polymerizable organic material;

(b) polymerizing the organic material and forming aggregates of the polymer and inorganic colloidal particles;

(c) collecting the aggregates and pretreating them in a generally oxygen-free atmosphere at a temperature and for a time effective to convert the polymer to a generally nonflowable state;

(d) pyrolyzing the pretreated aggregates at a temperature of less than 550° C. in an oxygen atmosphere for a time effective to produce substantially polymer-free particles; and (e) sintering the substantially polymer-free particles at a temperature and for a time effective to increase their mechanical strength.

The sintering step is preferably carried out in several steps to increase mechanical strength without compromising the pore structure. The resultant monodisperse particles are produced by the processes of the present invention without the need for classification. Thus, they can be referred to as nonclassified monodisperse particles.

The present invention also provides a continuous flow method for producing inorganic particles, preferably monodisperse particles having a porosity of about 5–60%. This method involves the steps of:

(a) combining an aqueous sol comprising a colloidal dispersion of inorganic particles with a polymerizable organic material in a continuous flow system;

(b) polymerizing the organic material and forming aggregates of the polymer and inorganic colloidal particles;

(c) collecting the aggregates and pyrolyzing them in an oxygen atmosphere at a temperature and for a time effective to produce substantially polymer-free particles; and (d) sintering the substantially polymer-free particles at a temperature and for a time effective to increase their mechanical strength.

The step of polymerizing the organic material and forming aggregates is preferably controlled such that inital formation of the aggregates occurs in one section of the continuous flow system, i.e., a first reactor, and growth of the aggregates occurs in another section, i.e., a second reactor. Thus, the continuous flow reactor systems used in the methods of the present invention can include one or more continuously stirred reactors, one or more plug flow reactors, or combinations thereof.

The present invention also provides sintered porous $ZrO_2$ particles. These particles are generally spherical agglomerates of colloidal $ZrO_2$ particles. The agglomerates have a particle size of about 0.5–15 μm, a porosity of about 5–60%, and a pore size of sufficient size to allow substantially complete penetration of molecules having a molecular weight of greater than about 20,000. These particles are useful as the stationary phase in a chromatography column, preferably a liquid, gas, or supercritical fluid chromatography column

BRIEF DESCRIPTION OF THE FIGURES

FIG. 1. Particle size distribution of $ZrO_2$ colloids used in Example 1, determined by photon correlation spectroscopy.

FIG. 2. The particle size distribution of final (polymer-free) aggregates determined by SEM.

DETAILED DESCRIPTION OF THE INVENTION

Figure 3A:
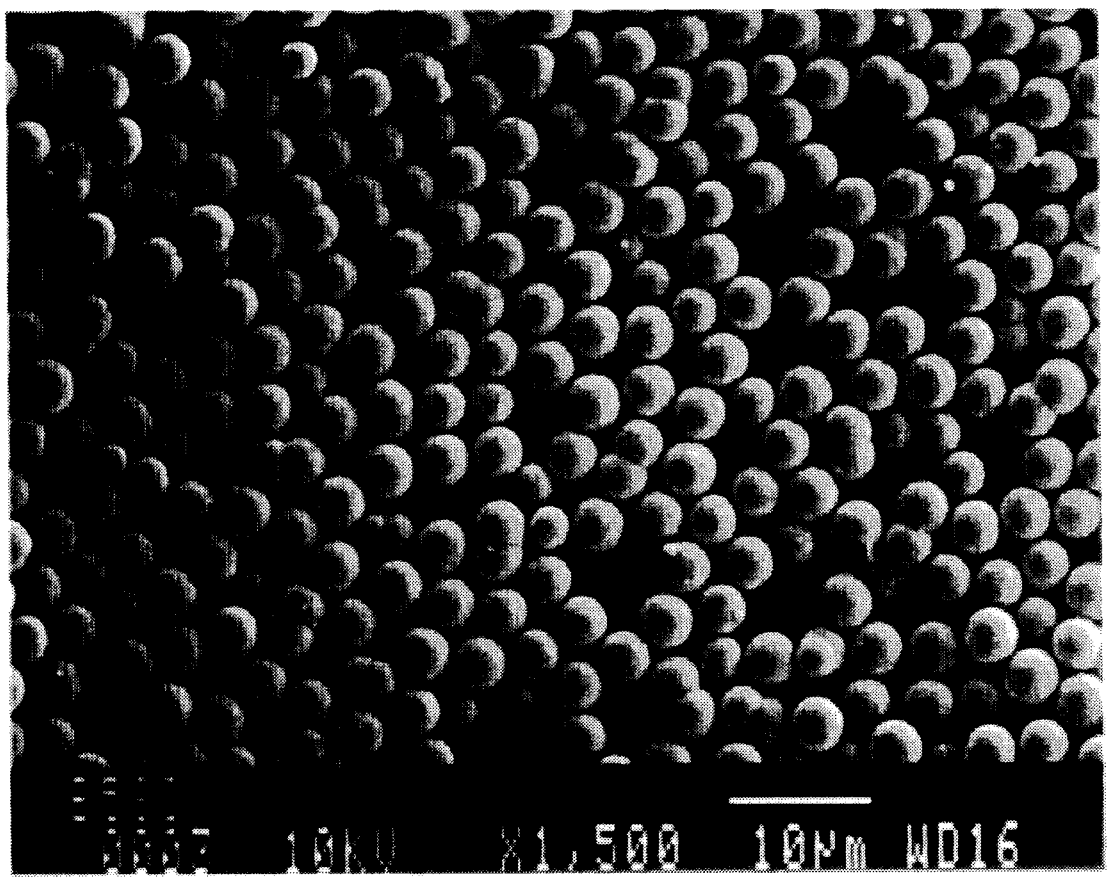
FIGS. 3A and 3B. (A) A SEM micrograph of $ZrO_2$ particles after sintering; and (B) a SEM micrograph of the surface of one of the particles shown in (A).

For purposes of the present invention, an adequate method is one that yields generally mechanically stable porous particles of a relatively narrow size distribution. The batch and continuous flow PICA processes of the present invention produce such particles. These improved methods involve combining an aqueous sol containing a colloidal dispersion of inorganic particles with a polymerizable organic material. The polymerizable organic material polymerizes and adsorbs onto the colloidal particles, entraining the colloidal particles in the polymer, and thereby allowing them to aggregate. These aggregates are then subjected to elevated temperatures to burn off the polymer and sinter the inorganic particles. The resultant or final particles are each an interconnected network or agglomeration of colloidal particles having a plurality of pores throughout. They are referred to herein as the "sintered particles," "sintered aggregates," or "sintered polymer-free" aggregates or particles.

Preferred processing parameters, e.g., temperature, reaction mixture composition, pH, and solvent polarity, for example, produce relatively high yields of generally spherical particles, i.e., spherules, having a porosity of about 5–60%, preferably about 40–50%, and a particle size of about 0.5–15 µm, preferably about 3–10 µm. Depending on the process used and the desired application, the more preferred particle size is about 3–5 µm or about 5–10 µm. As used herein, "particle size" is defined by the average of the longest dimension of each particle and can be measured by any conventional technique. Preferably, this is the average "diameter" of the particles because preferred particles are generally spherical in shape. Although the particles produced by the methods of the present invention are preferably spherical in shape, the methods could be used to produce irregularly shaped particles, however.

The particles produced are preferably monodisperse. By this it is meant that greater than about 70% of the particles have a particle size, e.g., diameter, within about 2 microns. For example, for a monodisperse sample of particles having an average particle size of about 3.5 µm, greater than about 70% of the particles have a particle size within a range of about 2 µm, e.g., about 2–4 µm. More preferably, the particles produced by the methods of the present invention have a particle size that varies by only about ±10% around the average particle size in a sample. This monodispersity occurs by controlling process parameters. Thus, no classification is necessary to prepare a monodisperse sample of particles using the methods of the present invention.

The generally spherical particles, i.e., spherules, produced by the methods of the present invention are generally chemically and mechanically stable in a wide pH range. They are preferably strong enough to withstand packing of an HPLC column. Such particles are preferably produced in a yield of greater than about 30%, more preferably greater than about 50%, and most preferably greater than about 70%. Yields greater than about 90% are possible with the continuous flow processes of the present invention.

The spherules of the present invention have generally uniform pores, the diameter of which depends on the size of the colloidal particles used in their preparation and the ratio of the volume of organic polymer to inorganic material used. The larger the particles, the larger the pores between them; the greater the proportional volume of organic polymer in the aggregates when formed, the more open the network of colloidal inorganic particles and the wider the pores. Typically, the pores are less than about 0.1 µm (1000 Å) in diameter. Preferably, for HPLC applications, the particles have a pore size of about 100–1000 Å, and more preferably about 200–500 Å. For preferred embodiment, the pore size distribution is also generally relatively narrow. Preferably, greater than about 70% of the pores have a pore size within a range that spans ±50% of the average pore size.

The sintered particles of the present invention can be coated with a hydrophobic cross-linked polymer such as polybutadiene, polyethyleneimine, and dextran, a layer of carbon, or a surface-absorbed phosphate. They could also have immobilized biomolecules, such as antibodies or enzymes. Preparation of such coatings are described, for example, in U.S. Pat. Nos. 5,015,373 (P. W. Carr et al.), 5,108,597 (E. G. Funkenbusch et al.), and 5,271,833 (E. F. Funkenbusch et al.), the complete disclosures of which are incorporated herein by reference. These document also disclose applications in which the improved $ZrO_2$ agglomerates of the present invention can be used. For example, they are particularly useful for chromatography applications, such as liquid chromatography, and supercritical fluid chromotography.

The sintered particles of the present invention are surprisingly different from the sintered particles described in U.S. Pat. No. 5,015,373 (P. W. Carr et al.) at least with respect to their accessible volumes for molecules, e.g., polymers or proteins, having a molecular weight of greater than about 20,000. That is, molecules having a large molecular weight, i.e., a molecular weight of greater than about 20,000, preferably greater than about 50,000, more preferably greater than about 100,000, and most preferably greater than about 150,000, penetrate the pores of the sintered particles produced by the improved PICA processes described herein. These molecules are capable of penetrating substantially all the accessible pore space of the sintered particles. In contrast, such molecules are excluded from all but a thin shell, i.e., periphery, of the particles described in U.S. Pat. No. 5,015,373. Of particular note, macromolecules even as large as 2 million molecular weight can penetrate the pores of the particles of the present invention, although not to the extent that the lower molecular weight molecules can.

The inorganic colloidal particles used in making the final sintered polymer-free aggregates are discreet finely divided particles of metals, metal oxides, metalloid oxides, as well as metal or metalloid oxide precursors (such as hydroxides that can be converted to oxides at elevated temperatures) having one or more of their dimensions within a range of about 1 nm to about 1 µm. These colloidal particles must also preferably be capable of forming a stable sol. As used herein, a "stable sol" is a solid-in-liquid two phase system wherein the solid consists of colloidal particles that do not begin to settle out of, or separate from, the liquid upon standing for about 2 hours (by visual inspection). Typically, this occurs if the inorganic particles are generally water insoluble and generally acid insoluble at a pH of about 2. Preferably, the particles have surface hydroxyl groups that assist in dispersing the colloidal particles.

Suitable sources of inorganic oxides are also refractory, i.e., they do not melt or otherwise decompose (other than to convert to an oxide if in the form of an oxide precursor, such as a hydroxide) at elevated temperatures. Preferably, they do not melt or otherwise decompose at temperatures up to about 500° C., and more preferably up to about 1000° C. Typically, suitable refractory particles have melting points greater than 1000° C. Lower melting oxides, or hydroxides that are converted to oxides by heating, can be used if the organic polymer constituent of the aggregate is removed by slow oxidation of the organic polymer at lower temperatures.

By definition, colloidal particles have at least one of their dimensions within a range of about 1 nm to about 1 μm. Preferably, no dimension is larger than about 1 μm. Particles having any dimension larger than about 1 μm are generally not suitable for use in preparing the desired spherical particles of the present invention. Typically, irregularly shaped, nonuniform, large particles form from such colloidal particles. More preferably, no dimension of the colloidal particles is larger than about 0.5 μm (5000 Å). Most preferably, the colloidal particles are generally spherical having an average particle size of about 30–150 nm (300–1500 Å).

The size of the colloidal particles contribute to the final pore size of the resultant sintered polymer-free aggregates. Thus, it is particularly desirable for the samples of colloidal inorganic particles used to be generally uniform in size. By this, it is meant that at least about 70% of the colloidal particles in a sample are within a range that spans ±50% of the average particle size of the colloidal particles.

Preferably, the inorganic colloidal particles include the metals in Groups IIIB, IVB, VB, and VIB, the metals and metalloids in Groups IIIA, IVA, and VA of the Periodic Table, as well as the lanthanides. In this context, metalloids and oxides or hydroxides of metalloids such as silicon, aluminum, and germanium, as well as metals and oxides or hydroxides of metals such as zirconium and tin, are included within the scope of the term "inorganic particle" as long as the particles are colloidal and can form a stable sol in water, preferably acidic water. If the inorganic particles, e.g., the oxides or the hydroxides that convert to oxides, are somewhat soluble in acid, they can be coated with an impervious layer of a less soluble inorganic oxide, such as silica, for example. Of these preferred inorganic particles, inorganic oxide particles, e.g., metal oxides and metalloid oxides, are the more preferred. Most preferably, the colloidal inorganic particles are alumina ($Al_2O_4$), titania ($TiO_2$), as well as silica ($SiO_2$) and zirconia ($ZrO_2$) or both ($ZrSiO_4$).

In particularly preferred applications, the colloidal particles are zirconium oxide ($ZrO_2$). Colloidal dispersions of zirconium oxide suitable for use as the $ZrO_2$ source used to prepare the sintered particles of the present invention are manufactured by Nyacol Inc., Ashland, Mass. These dispersions contain about 20 wt-% $ZrO_2$, wherein the colloidal $ZrO_2$ particles vary in average diameter, e.g., from about 10–250 nm. For example, Nyacol Zr 95/20 is an aqueous dispersion containing 20 wt-% colloidal $ZrO_2$ particles, the majority of which are about 95 nm in diameter.

Minor amounts of noncolloidal sources of the desired inorganic particles can be included within the sols used in the methods of the present invention. For example, noncolloidal $ZrO_2$ sources, i.e., those that do not produce a stable sol as defined above, can be included along with the colloidal $ZrO_2$ particles used to prepare the spherules of the present invention. Thus, chloride, nitrate, sulphate, acetate, formate or other inorganic or organic salts of zirconium, such as the oxysalts and alkoxides, can be included with the $ZrO_2$ sol and the mixture used to make the final sintered polymer-free aggregates. In such mixtures, however, colloidal $ZrO_2$ particles make up a major part of the total $ZrO_2$ present.

The final sintered polymer-free aggregates that contain a metal oxide, e.g., $ZrO_2$, can also include a minor amount (preferably less than about 20 mole-%) of a secondary metal oxide. For example, other metal oxides (or precursors thereof) can be included in the sols of the desired metal oxide (or precursor thereof), e.g., $ZrO_2$, so as to stabilize a particular crystalline phase of the desired metal oxide or to retard grain growth in the sintered particles. For example, salts or oxides sols of metals such as yttrium, magnesium, calcium, cerium, aluminum, and the like, can be included at levels of up to about 20 mole-% in a sol of $ZrO_2$. $ZrO_2$ particles fired in air or in oxidizing atmospheres that do not contain other oxide additives display either monoclinic, tetragonal, or pseudocubic crystal structures when cooled to room temperature. Higher firing temperatures and longer firing times favor the presence of the monoclinic phase. The inclusion of other metal oxides allows the preparation of particles that possess either monoclinic, tetragonal, or cubic crystalline structures.

The aqueous sol of dispersed inorganic oxide colloidal particles can include a miscible organic solvent capable of lowering the polarity of the liquid in the sol. Organic solvents having a lower dielectric constant than water can be used as long as they are miscible with water and form a stable sol as defined above. The organic solvent should also be generally noninterfering in the polymerization of the organic polymerizable material. Suitable such miscible organic solvents include alcohols such as methanol, ethanol, propanol, isopropanol (i.e., 2-propanol), as well as acetonitrile, tetrahydrofuran, dioxane, and dimethylsulfoxide.

If an organic solvent is desired, it is used in an amount effective to decrease the particle size of the final polymer-free aggregates. Preferably, it is typically used in the aqueous sol in an amount up to about 70 volume percent (vol-%), and more preferably up to about 50 vol-%. It has been observed that at a low concentration of organic solvent, e.g., dilution of a $ZrO_2$ sol with up to approximately 30 vol-% 2-propanol, alters the final polymer-free aggregated particle size, while leaving the particle size before polymer removal unchanged. In this same system at high concentrations of organic solvent, e.g., additional dilution with 2-propanol up to approximately 70 vol-%, there is a second effect that serves to decrease the size of the particles before polymer removal, while the final particle size also continues to decrease. Thus, the mixture of water and a miscible organic solvent provides advantage.

Suitable organic polymerizable materials for use in the methods of the present invention are those that are soluble in the polar liquid, i.e., water or a mixture of water and organic solvent, used to create the dispersion of the colloidal inorganic particles. They are also compatible with a stable aqueous sol of the colloidal particles at an acidic pH. By this it is meant that they do not cause flocculation or dissolution of the colloidal particles (at least within the 2 hour period typically required for a sol to be stable).

A polymerizable organic material, which can be a mixture of components, can be used as long as they produce the desired aggregated inorganic particles. Typically, a polymerizable material that polymerizes, adsorbs onto the inorganic colloidal particles, and subsequently forms loose flocs of colloids that collapse, i.e., fold in on themselves, into particles, preferably spherical particles, can be used. Typically, the loose flocs do not have a well defined morphology. Thus, as the flocs grow there is a transition from a nondescript to a well-defined morphology. At this point the aggregate is generally stable and is not considered a floc, but a submicron particle. This transition includes formation of a denser packing of colloids within the submicron particle than in the floc.

Examples of suitable polymerizable organic materials include: mixtures of formaldehyde and urea or melamine;

pyrrole; and a mixture of phenol and formaldehyde. Preferably, the polymerizable organic material is a mixture of formaldehyde and urea or melamine. More preferably, it is a mixture of formaldehyde and urea. This material is generally polymerized under acidic conditions. Although the colloidal sols used are generally acidic in nature, additional strong acids can be added to adjust the pH. Preferably, the acids used are strong inorganic acids, and more preferably, protonic acids, such as $HNO_3$, HCl, and $H_2SO_4$, for example.

The polymerizable material (or components thereof) is used in an amount effective to produce desired results with respect to a yield, particle size, and particle size distribution. For example, formaldehyde is initially present in the reaction mixture (i.e., in combination with the aqueous sol containing the colloidal dispersion of inorganic particles) in an amount effective to produce a concentration of about 0.05–5.0 M, and more preferably about 0.1–3.0 M. Similarly, urea is initially present in the reaction mixture in an amount effective to produce a concentration of about 0.05–5.0 M, and more preferably about 0.1–3.0 M. For batch processes, both are most preferably present in an amount effective to produce a concentration of about 1.0–2.5 M. Preferably, the molar ratio of urea to formaldehyde is within a range of about 1:0.5 to 1:2, and more preferably within a range of about 1:0.8 to 1: 1.4.

The aggregated particles, i.e., aggregates formed upon polymerization can be described simply as masses of polymer, preferably spherical masses of polymer, in which the colloidal particles are embedded. They are referred to herein as aggregates or polymer-containing aggregates. They typically have a particle size of about 2–15 μm, preferably about 4–6 μm. The ratio of organic polymerizable material to inorganic material used in the reaction mixture is such that, after polymerization, these aggregates contain about 10–90 wt-% of the inorganic material. Preferably, the aggregates contain about 20–60 wt-% inorganic material, more preferably about 40–60 wt-%, and most preferably about 45–55 wt-% inorganic material.

The polymerization reaction is typically carried out at a temperature effective to cause polymerization of the organic polymerizable material. Preferably, the polymerization reaction is carried out at a temperature of about 5°–50° C., and more preferably about 15°–30° C. At temperatures below about 5° C., yields tend to be low. At temperatures above about 50° C, and sometimes above about 30° C., the polymer and colloidal particles tend to form an undesirable gel, rather than aggregates.

The polymerization reaction is preferably carried out in a container having a nonpolar surface, such as a plastic container. Plastics that do not provide sites for heterogeneous nucleation of polymers are useful materials for the reaction containers. By using a plastic container, generally monodisperse particles are formed. Glass containers can also be used as long as the surface is modified to be nonpolar, as with organic silylated glass. Examples of suitable plastics are hydrophobic plastics such as polypropylene and teflon. For the preparation of monodisperse particles, it is particularly advisable to use new containers because scratches, residual particles, hard water films, and the like, can cause increased polydispersity.

The pH of the reaction mixture in which the polymerization occurs is effective to provide sufficient coverage of the colloidal particles, e.g., $ZrO_2$, by polymer, e.g., urea-formaldehyde polymer, necessary to connect the colloids and establish open pores while avoiding the precipitation of colloid-free polymer beads. This pH also provides for a large number of polymer molecules available for the formation and growth of additional aggregates. Preferably, this pH is less than about 6, and more preferably within a range of about 1–3. In particularly preferred embodiments, the pH at which the polymerization is carried out is 1.5–2. For example, a pH of 1.5 with a $ZrO_2$ colloidal particle concentration of 1.9 M, formaldehyde concentration of 1.5 M, and a urea concentration of 1.2 M, the $ZrO_2$ content of aggregates before polymer removal, and consequently the apparent density, tend toward a maximum; so does the yield of sintered $ZrO_2$ particles; whereas the polymer-content tends toward a minimum. It should be understood that this pH has been optimized for the specified reaction conditions.

As the pH of the reaction mixture decreases, the rate of polymerization increases, and the ratio of the rate of polymerization to polymer absorption increases. The aggregation process appears to be sensitive to the rate of polymerization and to the amount of adsorbing polymer. Furthermore, the rate of polymerization appears to play a significant role in the packing arrangement of the colloidal particles and the properties, particularly the resulting pore structure, of the composite aggregates and sintered particles. Thus, while the rate of polymerization increases with decreasing pH, a balance must be struck between the rates of polymerization and polymer adsorption onto the colloids. If polymerization is significantly faster than polymer adsorption, for example, aggregates are formed that result in hollow shells upon polymer removal.

For example, $ZrO_2$ spherules synthesized at pH≤1.4 with a $ZrO_2$ colloidal particle concentration of 1.9 M, formaldehyde concentration of 1.5 M, and a urea concentration of 1.2 M, can not generally withstand packing in an HPLC column. During the packing process broken pieces of spherules plug the column. This poor mechanical strength arises from the fact that at least some of these spherules are hollow. Similar phenomena are observed with clusters of gold, silica and polystyrene prepared under rapid (diffusion-limited) and slow (reaction-limited) aggregation conditions. Generally, clusters formed under rapid coagulation have much more open structures than the clusters formed under slow coagulation. For $ZrO_2$ particles synthesized above pH 1.4 under these same conditions, there is a significant contribution of the total pore volume by pores less than 300 Å in diameter. The presence of these smaller pores indicate a sufficiently dense colloid packing structure that can generally withstand the HPLC column-packing process.

Control of aggregation and clustering of particles is important in controlling the final pore structure. Control of aggregation is best accomplished by using a continuous flow process. However, other steps can be taken to prevent clustering of the aggregates, whether polymerization and aggregation is carried out in a batch process or a continuous flow process. For example, if mechanical agitation is used during polymerization and aggregation, the number of clusters formed is reduced. Also, if the aggregates are suspended in a polar organic solvent with a lower surface tension than water, upon drying they tend to form a free-flowing powder rather than a cluster of aggregates. This polar organic solvent can be the same as the one described above that can be added to the aqueous sol during the polymerization and aggregate formation step.

Continuous flow processes of the present invention can be carried out in a plug flow reactor (PFR), a continuously stirred reactor (CSTR), or a combination thereof. Preferably, at least one plug flow reactor is used. More preferably, a plug flow reactor is used in combination with a continuously stirred reactor. Whichever system is used, aggregation can be more readily controlled than in a batch reactor system typically because a more constant set of conditions is used. Thus, using continuous flow systems, the final pore structure of the sintered polymer-free particles can be better controlled.

Continuous flow processes of the present invention are designed such that aggregates are formed continuously. This is accomplished by providing the necessary reactants in a continuous manner using flow rates such that the Reynolds' Number is preferably less than about 2000 and residence times are appropriate for the desired result.

In preferred continuous flow systems, i.e, with multiple reactors, initial formation of agglomerates, i.e., nucleation, and agglomerate growth, can be separated. Therefore, each of these stages can be carried out under different conditions, e.g., different reactant concentrations. In such a system, nucleation is controlled by contacting an amount of polymerizable organic material with the colloidal particles in a less than stoichiometric ratio. That is, the polymerizable organic material is the limiting reagent. Concentrations of reactants are then adjusted to allow for growth of agglomerates but no further nucleation.

Whether formed using a continuous flow process or batch process, upon polymerization, the aggregates of the present invention are collected (and dried if desired) and subsequently heated at a sufficiently high temperature to pyrolyze the polymer but at a sufficiently low temperature to avoid abrupt combustion and the explosive escape of combustion gases. Preferably, this pyrolysis step occurs at a temperature of less than 550° C., more preferably less than about 500° C., and most preferably at a temperature of about 300°–400° C., in an oxygen atmosphere. This pyrolysis is carried out for a sufficient period of time to remove or burn off a substantial amount of the polymer to form substantially polymer-free agglomerated particles. It should be understood that even though a substantial amount, i.e., greater than about 90%, of the polymer is burned off during pyrolysis, the particles can contain carbonaceous by-products of the pyrolyzed polymer, as well as residual amounts of polymer. Preferably, this pyrolysis step is carried out for at least about 1 hour, and more preferably for about 1.5–3.0 hours.

In particularly preferred embodiments, this pyrolysis step is preceded by a pretreatment step. In this pretreatment step, the polymer is conditioned such that it will not generally flow during the subsequent pyrolysis step and interfere in the formation of aggregates of colloidal particles that are substantially free of organic polymer. This pretreatment step also reduces the formation of undesirable clusters of aggregates. Without this pretreatment step, the polymer-containing agglomerates can fuse and/or form clusters.

This pretreatment or conditioning step is carried out by heating the aggregates in a generally oxygen-free environment at a temperature and for a time effective to appropriately condition the polymer. Preferably, this involves heating at a temperature of about 100°–270° C., more preferably about 150°–200° C., for at least about 6 hours, more preferably for about 6 hours to about 4 days. In particularly preferred embodiments, this pretreatment step is carried out in a reduced atmosphere, e.g., under a vacuum (preferably less than about 260 mm Hg, and more preferably a full vacuum). This step is particularly useful for aggregates containing less than about 50 wt-% of the inorganic material.

Subsequent to removing substantially all the organic polymer from the aggregates in the pyrolysis step, the inorganic particles are sintered to increase their mechanical strength. Sintering may be visualized as the closing of pores within the aggregates due to the surface tension of the solid surface which exerts a contracting force on the colloidal particles surrounding a pore. Since the compressive strength of the aggregates is low at high temperature, the colloidal particles are drawn together and the pores between them shrink. A temperature that reduces the specific surface area of the aggregates by at least about 10% below the value obtained on a powder dried from the original sol is generally sufficient. Preferably, sintering occurs at a temperature of about 750°–1000° C., although temperatures above 1000° C. can be used. Sintering is carried out for a time effective to increase the mechanical strength of the particles a desired amount. Typically, about 1–15 hours is preferred. Sintering can be carried out in an oxygen atmosphere, although this is not necessary.

In particularly preferred embodiments, sintering is carried out in a multistep fashion, preferably in two steps. In the first sintering step, the substantially polymer-free particles are heated at a temperature and for a time effective to burn off a substantial portion of any remaining polymer and to stabilize the preferred pore coordination number (R), which is the number of touching colloidal particles forming a pore. Preferably, in this step substantially polymer-free particles are heated at a temperature of about 600°–800° C. for about 0.5°–10 hours. In the second sintering step, the substantially polymer-free particles are heated at a temperature and for a time effective to strengthen them at the preferred coordination number a sufficient amount for them to withstand packing in an HPLC column. Preferably, in this step they are heated at a temperature of about 800°–1000° C. for about 0.5–5 hours.

Although the particles of the present invention are particularly useful in HPLC applications, e.g., reverse-phase, ligand-exchange, ion-exchange, affinity, and size exclusion chromatography, they can be used in other applications as well. For example, they can be used in heterogeneous catalytic systems either as the catalyst itself or as a support for a catalyst. They can also be used in ultrafiltration applications.

Objects and advantages of this invention are further illustrated by the following examples. The particular materials and amounts thereof recited in these examples as well as other conditions and details, should not be construed to unduly limit this invention. All materials are commercially available except where stated or otherwise made apparent.

EXPERIMENTAL EXAMPLES

EXAMPLE 1

Effects of Various Processing Parameters

A. Materials and Methods

Zirconia sol (pH 1), containing 20 weight-% (wt-%) $ZrO_2$ particles with a mean diameter of 700 Å (Zr50/20), was purchased from Nyacol Products, Inc. (Ashland, Mass). Pure urea and 37 wt-% aqueous formaldehyde were purchased from Mallinckrodt Specialty Chemical Co. and Fisher Scientific, respectively. Deionized distilled water was used as the water source in all cases.

The colloid particles were characterized by photon correlation analysis using a Coulter N4SD particle size analyzer. Prior to analysis, the zirconia sol was placed in a sonicator for three minutes to assist the break up of loosely aggregated particles. Each sample was run in triplicate and the mean distribution is reported. For these analyses, water was used as the solvent and a particle refractive index of 1.19 was used in calculating the wt-% particle size distribution. Particle size distributions for the product particles (aggregates) were obtained from micrographs taken on a Hitachi 450 scanning electron microscope. Nitrogen adsorption and desorption isotherms at 77K and mercury porosimetry data were collected on a Porous Materials Inc. Mercury/Non-Mercury Porosimeter and Automated BET Sorptometer. The $ZrO_2$ content of the aggregates before polymer removal was determined by the difference in mass of a bed of particles before and after polymer removal by heating.

To test the performance of the final particles (after polymer removal and sintering) as a HPLC column packing material, the sintered $ZrO_2$ particles were coated with polybutadiene according to the procedure described in U.S. Pat. No. 5,015,373 (P. W. Carr et al.) and packed in a 5×0.46 cm chromatographic column. The chromatographic tests were performed on a Perkin-Elmer Series 3B Liquid Chromatograph with a Perkin-Elmer LC-15 detector at 254 nm.

A preferred PICA synthesis was accomplished by the following procedure. In a new polypropylene beaker, the urea was dissolved in the $ZrO_2$ sol. At room temperature, aqueous formaldehyde was rapidly added to the mixture and, simultaneously, moderate mechanical agitation was applied by a vibromixer to prevent particle clustering. The aggregate particle size distribution is reproducible when polypropylene beakers with fresh, nonpolar surfaces are used for each synthesis, but not when new glass beakers are used. Agitation was continued for 15 minutes, after which time the reaction mixture was diluted with water to quench the reaction. For this study of changes in synthesis variables, however, the reactions were allowed to proceed until no further changes in particle size were observed by optical microscopy. After the growth of micron-scale particles, a second set of submicron-scale particles were observed to grow. The micron-scale aggregates of colloids were separated from submicron-scale aggregates by sedimentation. The particle size distributions reported here correspond to the micron-scale aggregates after removal of the submicron aggregates. Although not characterized here, the particle size distribution before submicron particle-removal would be bimodal. The resulting micron-scale particles were resuspended in 2-propanol and collected on a sintered glass funnel by vacuum filtration.

The dried, free-flowing powder was then subjected to a staged heating process. The particles were first heated in a vacuum oven at 170° C. for 16 hours, then at 350° C. in a muffle furnace with sufficient air access to allow most of the polymer in the particles to be burned off. The temperature was raised to 700° C. and the particles were heated for 3 more hours to substantially completely burn off any remaining polymer. Finally, the particles were sintered at 900° C. for 3 hours to improve their mechanical strength.

B. Results

1. Characterization of the Zirconia Particles

The particle size distribution of the starting colloids (as purchased from Nyacol and subsequently centrifuged, but before any PICA processing) is shown in FIG. 1. The size distribution shows 85 wt-% of the particles between 460 and 1000 Å in diameter.

The conditions for a preferred PICA synthesis procedure are listed in Table 1. For comparison, the synthesis conditions reported in U.S. Pat. No. 4,010,242 (Iler et al.) are also included in this table.

TABLE 1

Reaction Mixture Compositions

| Concentration (M) | This Work | Iler et al. |
|---|---|---|
| $ZrO_2$ | 1.62 | 0.62 |
| Formaldehyde | 2.46 | 0.86 |
| Urea | 2.00 | 0.70 |
| Colloid Diameter | approximately 650 Å (mean diameter) | 500–1000 Å |
| Reaction pH | 1 | 2 |
| Reaction Time | 15 minutes | 18 hours |
| Yield of $ZrO_2$ | 25% | 33% |

Figure 3B:
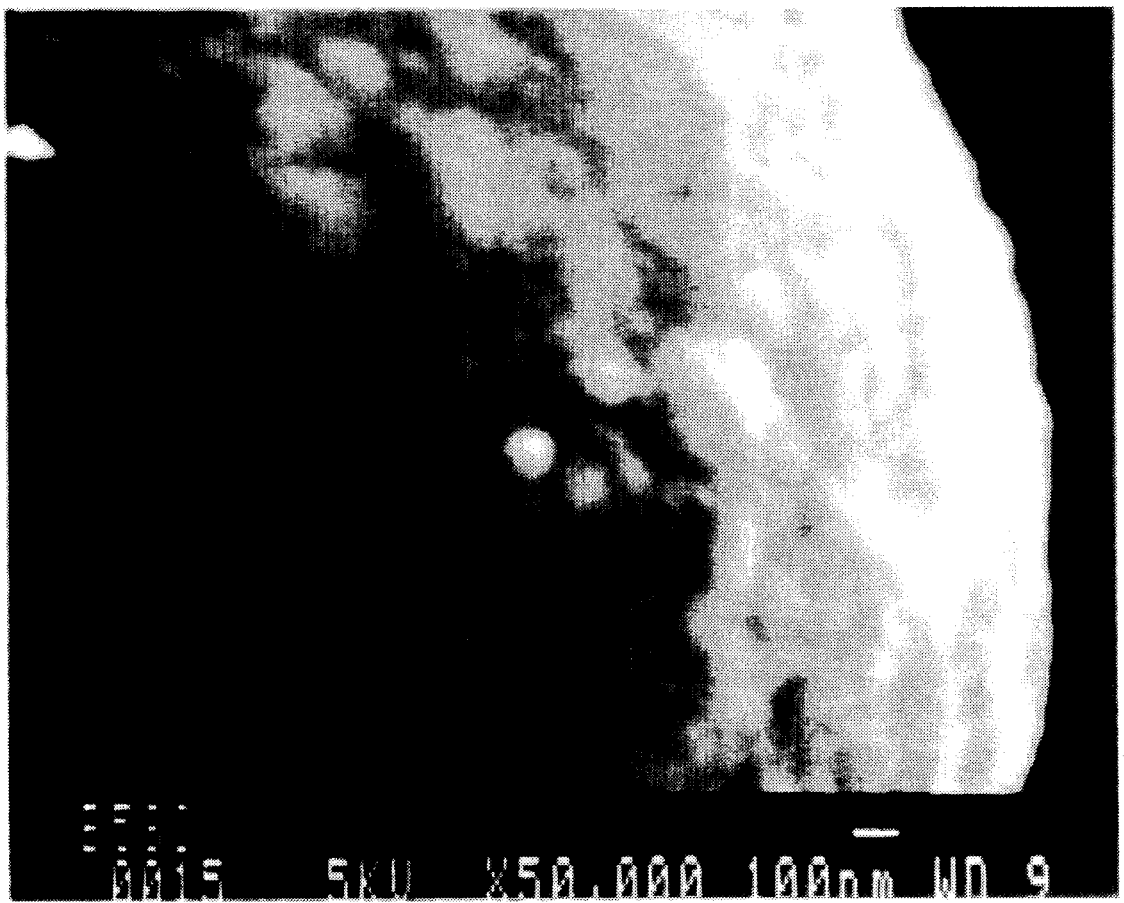

The particle size distribution after sintering determined by SEM, measuring 300 particles, is shown in FIG. 2. The average diameter is 3.5 μm after sintering. The particles were spherical and free from clustering, as evidenced by the SEM micrograph shown in FIG. 3A. A micrograph of a particle surface, shown in FIG. 3B, reveals that the final particle was a randomly-packed aggregate of approximately 700 colloids. The fraction of $ZrO_2$ recovered in the micron-scale aggregates was 25 wt-%, which is lower than optimum generally because the pH of the reaction mixture was not optimized.

Figure 4B:
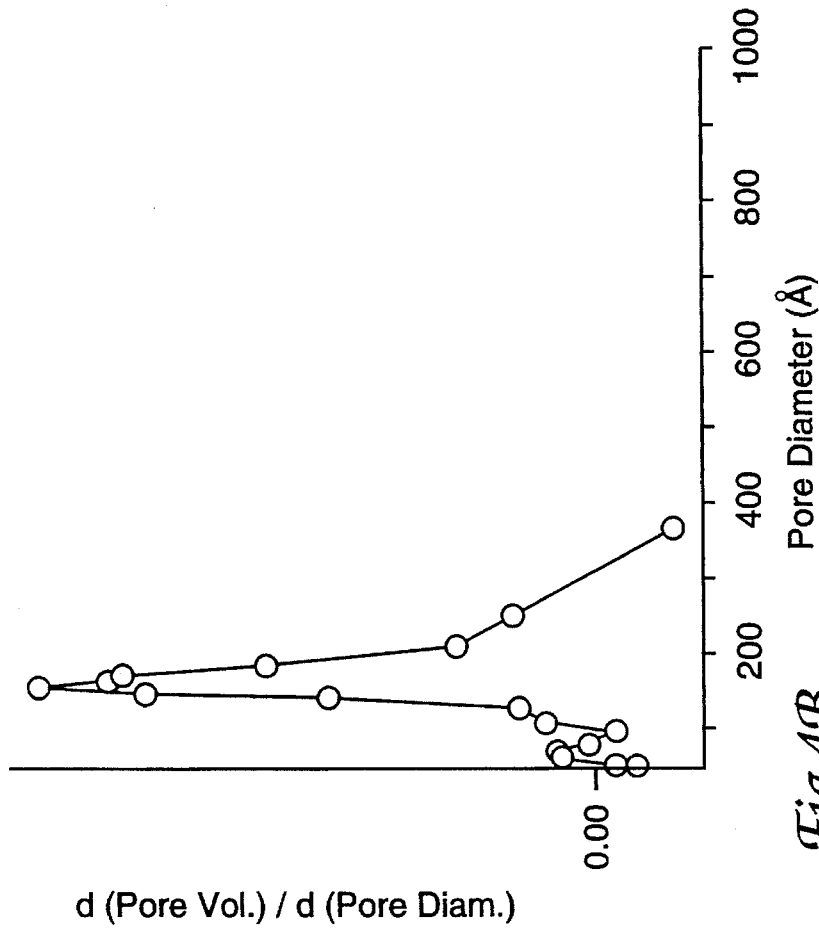
FIG. 4. Pore size distributions for $ZrO_2$ particles after sintering, as determined by (A) nitrogen adsorption at 77K, (B) nitrogen desorption at 77K.
Figure 4A:
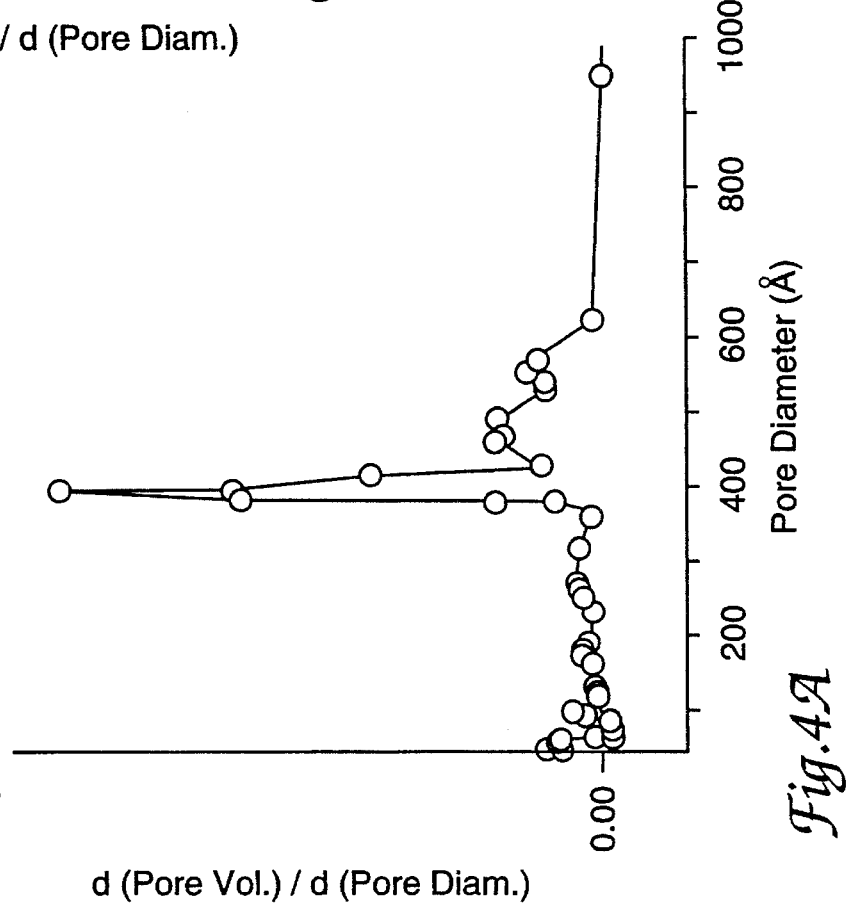
Figure 5:
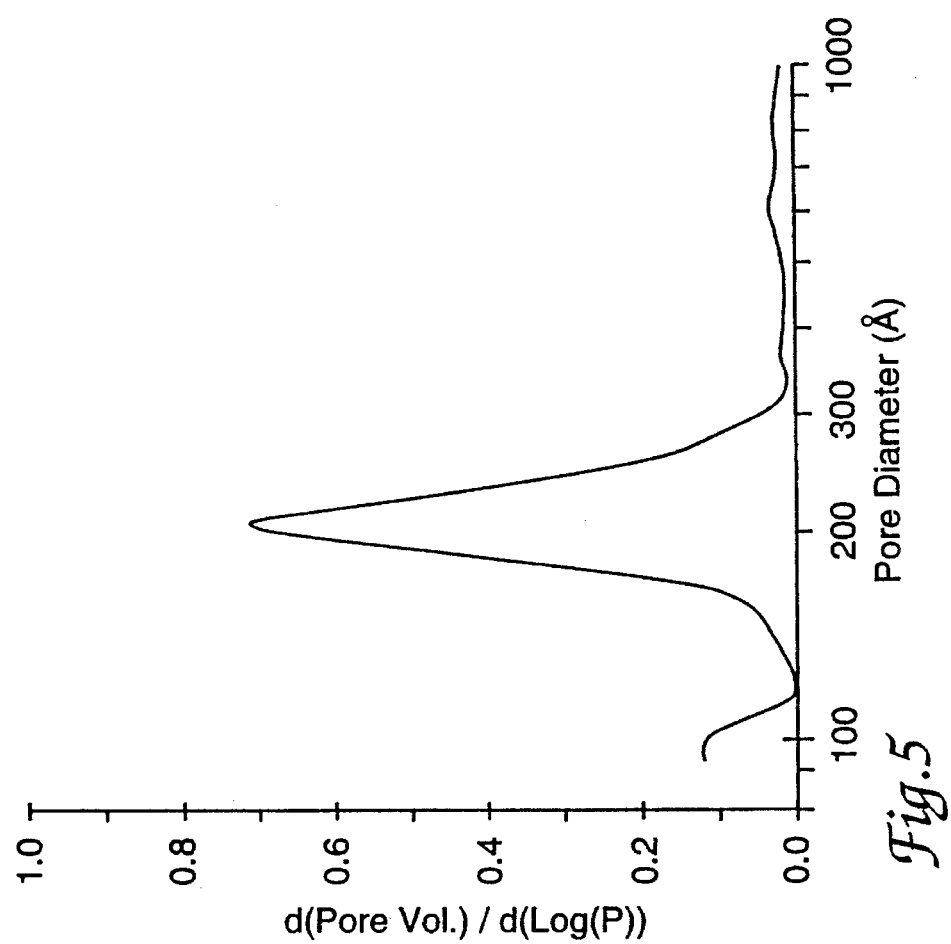
FIG. 5. Pore size distribution for $ZrO_2$ particles after sintering, as determined by mercury porosimetry.

The specific surface area and porosity of the sintered particles measured by nitrogen adsorption were 13 $m^2/g$ and 29%, respectively, which are in reasonable agreement with close-packed, dense $ZrO_2$ spheres with nonuniform particle size. The pore size distributions (psd) obtained by nitrogen adsorption and desorption, and mercury porosimetry (intrusion) are displayed in FIGS. 4A, 4B and FIG. 5, respectively. From $N_2$ adsorption, the psd was determined to be rather narrow with a maximum near 400 Å and a small contribution of pores larger than 500 Å and smaller than 100 Å. From $N_2$ desorption, the psd was determined to be multimodal with nearly all pores between 100 Å and 200 Å in diameter and some pores below 50 Å. This discrepancy is mainly due to pore blocking or network effects, whereby desorption from a pore in a network is influenced by the state of the neighboring pores. Nitrogen adsorption probes the main channel size and can be considered free of pore blocking effects, while nitrogen desorption shows a disproportionately large amount of small pores due to "bottle necks." The psd obtained from mercury porosimetry (intrusion) are also influenced by pore interconnections; as shown in FIG. 5, it is broad with pores between approximately 125 Å and 300 Å in diameter and a maximum near 200 Å, in reasonable agreement with the psd from $N_2$ desorption.

To test the chromatographic performance of the final $ZrO_2$ particles, the reversed-phase separation of benzene, toluene, and ethylbenzene was performed on polybutadiene-coated $ZrO_2$. The separation was good, demonstrating the potential of using $ZrO_2$ particles, prepared by the improved batch PICA method, for other chromatographic applications. During the chromatographic tests, the column back pressure remained constant. This observation indicates that the packing material was mechanically stable under the conditions studied.

2. Variation of Synthesis Parameters Affecting Particle Size Distribution

While there can be innumerable combinations of possible synthesis parameters, several key parameters were examined—temperature, reaction-mixture composition (concentrations of urea, formaldehyde, $ZrO_2$, and solvent), and solvent polarity—and their effect on particle size distribution.

Figure 6:
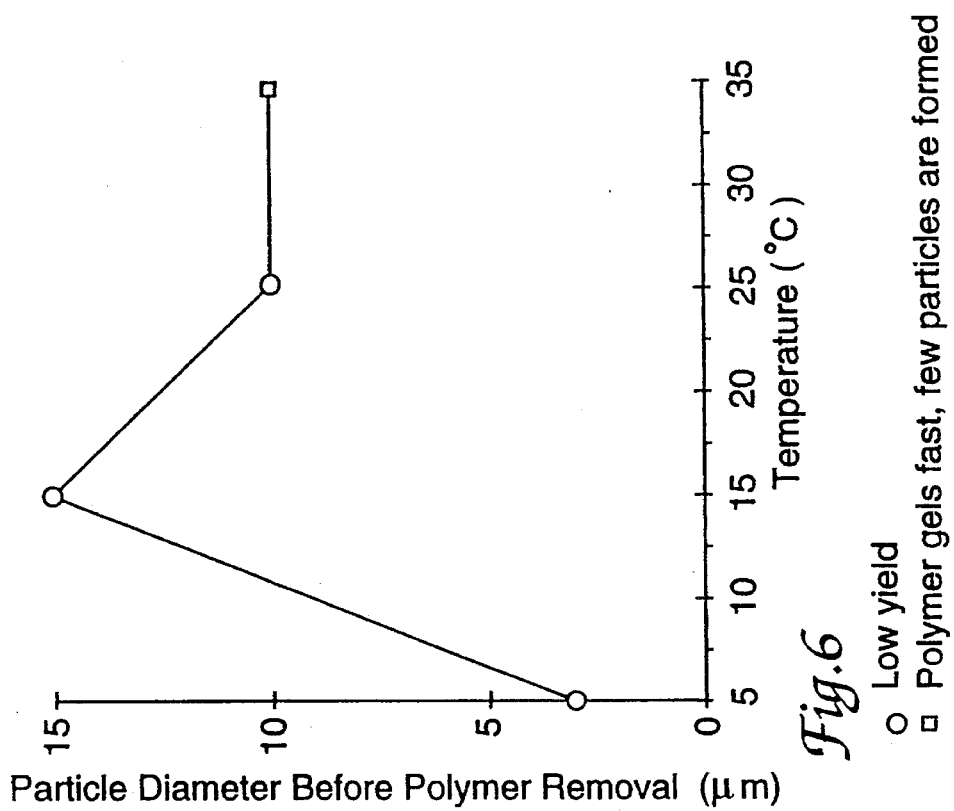
FIG. 6. Effect of reaction temperature on the diameter of the particles before polymer removal. Each experiment was repeated three times.

The effect of temperature on the particle size before polymer-removal is shown in FIG. 6. At a reaction temperature of 15° C., the particle size before polymer removal reached a maximum of 15 μm. This apparently corresponds to an optimum rate of polymer growth, since at temperatures higher than 30° C. a gel resulted under the conditions of this reaction, indicating that the rate of urea-formaldehyde polymerization was too fast. Apparently, at lower temperatures the polymerization reaction was slower, and yields were lower.

To study the effect of reaction mixture composition, the concentration of each component (solvent, $ZrO_2$, urea, formaldehyde) was varied. Dilution of the reaction mixture two to five fold with pH 1 $HNO_3$ solution (to uniformly dilute all reactants) did not affect the particle size distribution, although the final yield did decrease by a factor of 3/5 with three fold dilution. Thus, the particle size depends on the ratio of reactants provided.

The concentration of $ZrO_2$ in the sol was varied from 10–40 wt-% (keeping other concentrations constant) but this produced no changes in particle size distribution before polymer removal. The fraction of $ZrO_2$ embedded in the particles before polymer removal changed only slightly, as shown in Table 2, suggesting that the mechanism of particle formation dictates the ratio of polymer/$ZrO_2$ in the particles.

TABLE 2

Zirconia Content In The Dry Particles Before Polymer Removal As A Function of Zirconia Concentration In The Initial Sol[a]

| Weight % $ZrO_2$ in the sol | Weight % $ZrO_2$ in particles before polymer removal |
| --- | --- |
| 10 | 26 |
| 20 | 30 |
| 40 | 35 |

[a]All other concentrations are those reported in Table 1.

Figure 7:
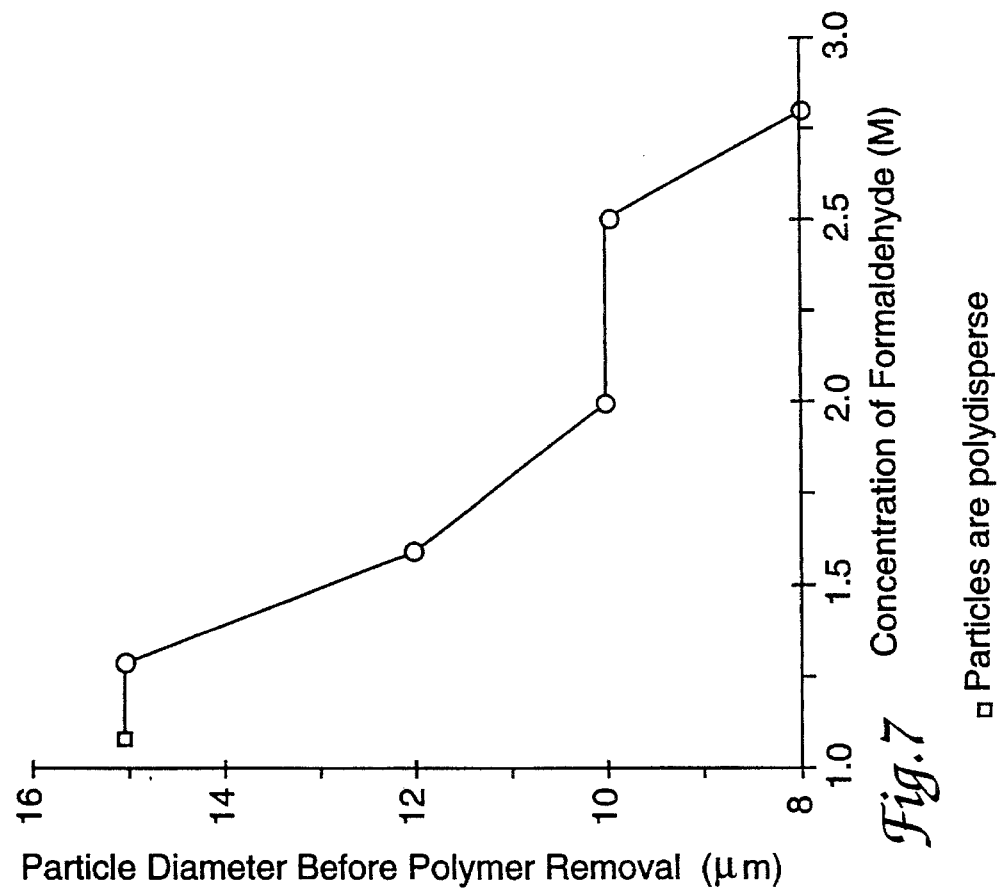
FIG. 7. Effect of formaldehyde concentration on particle diameter before polymer removal. All other reactant concentrations remained fixed. Each experiment was repeated three times.

Increasing the concentration of formaldehyde from 1.1 M to 2.8 M (FIG. 7) decreased the particle size before polymer removal by a factor of approximately 1.9. When the urea concentration was increased from 1.3 M to 6.7 M (FIG. 8) a reproducible particle size maximum was seen at a urea concentration of 2.7 M. These results indicate an optimum stoichiometry of the urea-formaldehyde (UF) polymer. This also indicates that there is an apparent maximum particle size limit (before polymer removal) of approximately 15 μm.

During the batch PICA reaction while one set of particles is approaching its final size, a second group of submicron aggregates form. These submicron particles do not grow to the micron scale, possibly due to depleted concentrations of polymer in solution after the formation of the first set of submicron particles. This phenomenon may result from the interplay of the rates of polymer growth and of flocculation.

Although the inventors do not wish to be held to any particlar theory, it is believed that in the early stages of the urea-formaldehyde (UF) polymerization, polymer growth is fast due to the high concentration of reactants. Thus, many flocs can form and subsequently transform into submicron particles because of the high initial concentration of polymer. Further growth of the particles occurs at the expense of UF polymer solution species. After the formation of the first set of submicron particles, the solution polymer species will continue to be generated albeit at a slower rate due to diminishing concentrations of the monomers. Because of the lower polymer concentration in solution, further floc formation will be inhibited. As the particles from the first nucleation approach their maximum size (approximately 10 μm in this work), their growth rate will decrease (reaction-limited growth at this stage). The concentration of polymer in solution will again begin to increase, making it easier for more flocs to transform into particles. The result is a second burst of growing particles and a bimodal particle size distribution. The growth of the second set of particles is probably reactant (polymer) limited otherwise they too should grow to approximately 10 μm.

Figure 9:
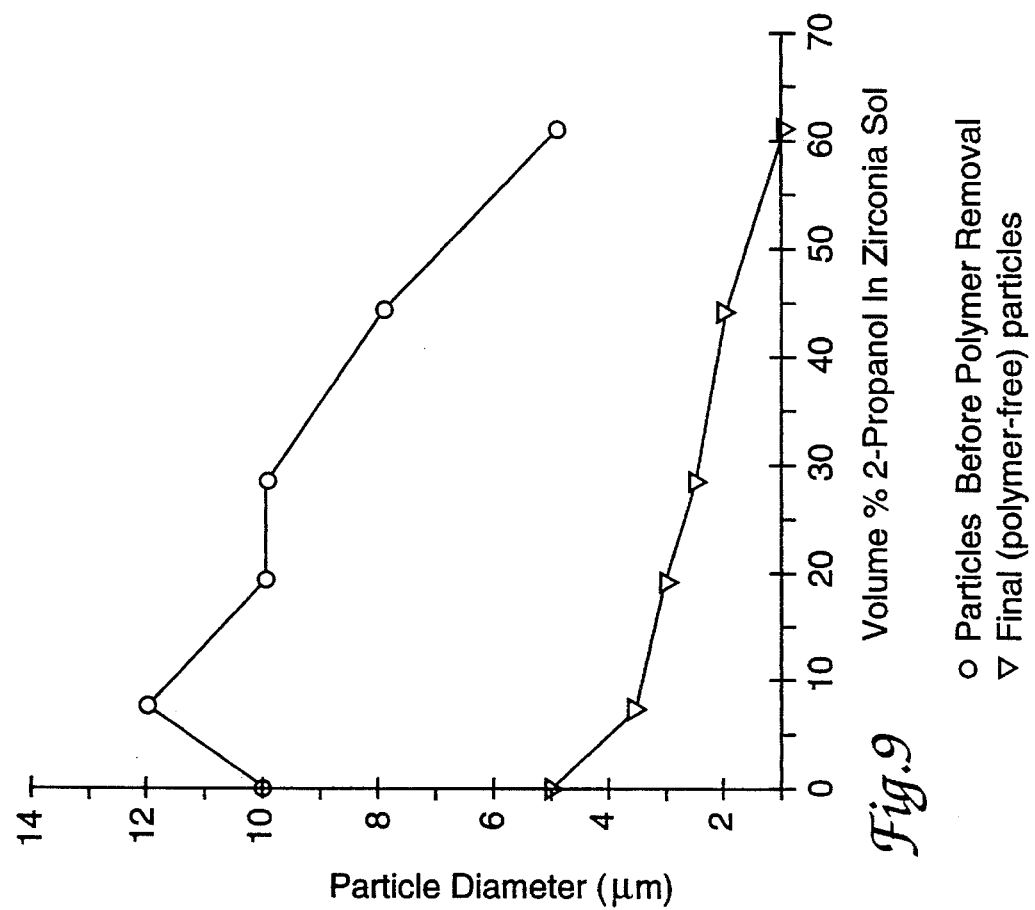
FIG. 9. Changes in particle diameter before and after sintering as a function of volume-% 2-propanol in the $ZrO_2$ sol. All other reactant concentrations remained fixed. Each experiment was repeated three times.

Adding 2-propanol to the $ZrO_2$ sol to reduce the solvent polarity decreased both the particle size before polymer removal and the sintered-particle (final particle) size (FIG. 9). Recall that when the initial reaction mixture was diluted with pH 1 $HNO_3$ solution, there was no change in particle size but the yield of 10 μm particles decreased. Above 28 vol-% of 2-propanol the reduction of particle sizes before and after polymer removal was nearly linearly related as the concentration of 2-propanol increased. Hence, at high vol-% of 2-propanol the ratio of polymer/$ZrO_2$ in the aggregates before polymer removal was not changing but the size of the aggregates decreased. As the solvent becomes less polar, it is believed that it may be easier to form larger numbers of nuclei, hence the final particles are smaller due to reactant (polymer) limited growth, although the inventors do not wish to be limited by this theory.

3. Synthesis Parameters Affecting Clustering

Some of the synthesis parameters—temperature, urea and formaldehyde concentrations, and dilution of the reaction mixture—also affect the undesired clustering of the spherical aggregates. In addition to these, mechanical agitation, the polarity of the solvent used during the collection and redispersing processes, and the nature of the polymer removal process also affect clustering.

Figure 8:
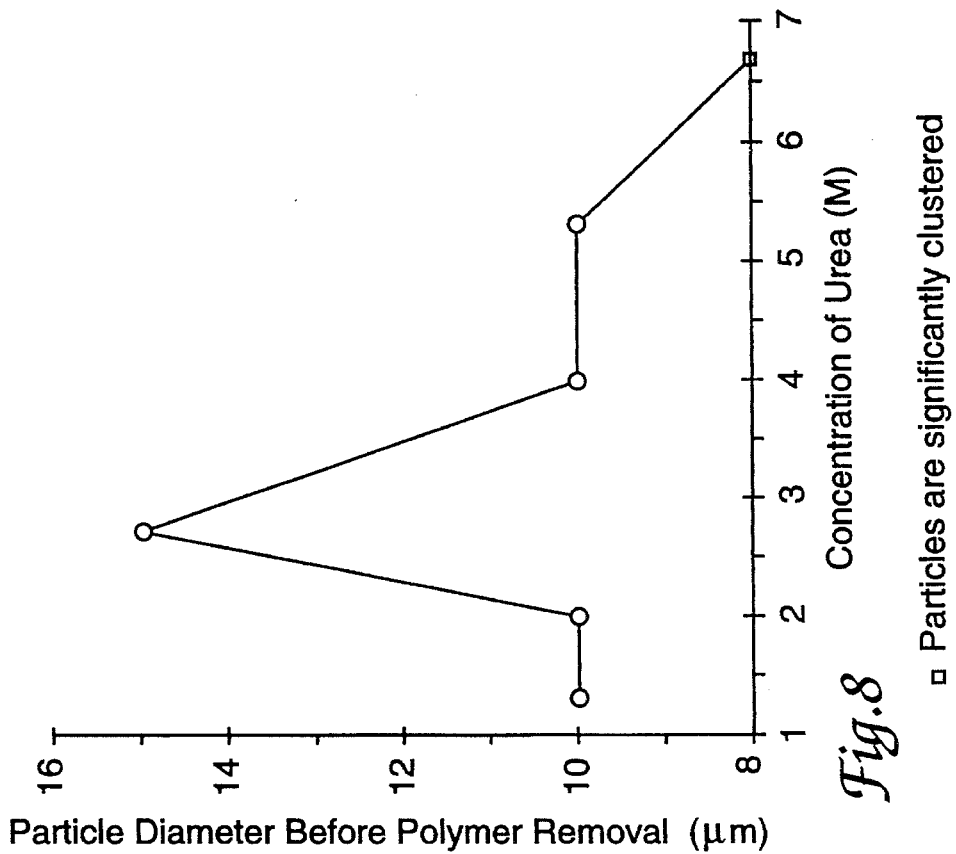
FIG. 8. Effect of urea concentration on particle diameter before polymer removal. All other reactant concentrations remained fixed. Each experiment was repeated three times.

Clustering of the aggregates increased at higher temperatures (FIG. 6) and at higher concentrations of formaldehyde (FIG. 7) and urea (FIG. 8). Aggregate clustering was minimized by diluting the initial reaction mixture with pH 1 aqueous nitric acid solution while maintaining the proportions of $ZrO_2$, urea, and formaldehyde. For example, when the initial mixture was diluted by a factor of five, the fraction of clustered particles decreased to less than 10% of the total number of particles. Apparently, then, reducing the opportunity for contact between individual aggregates greatly reduces the possibility of forming permanent clusters. On the other hand, the yield also decreased with dilution.

Figure 10A:
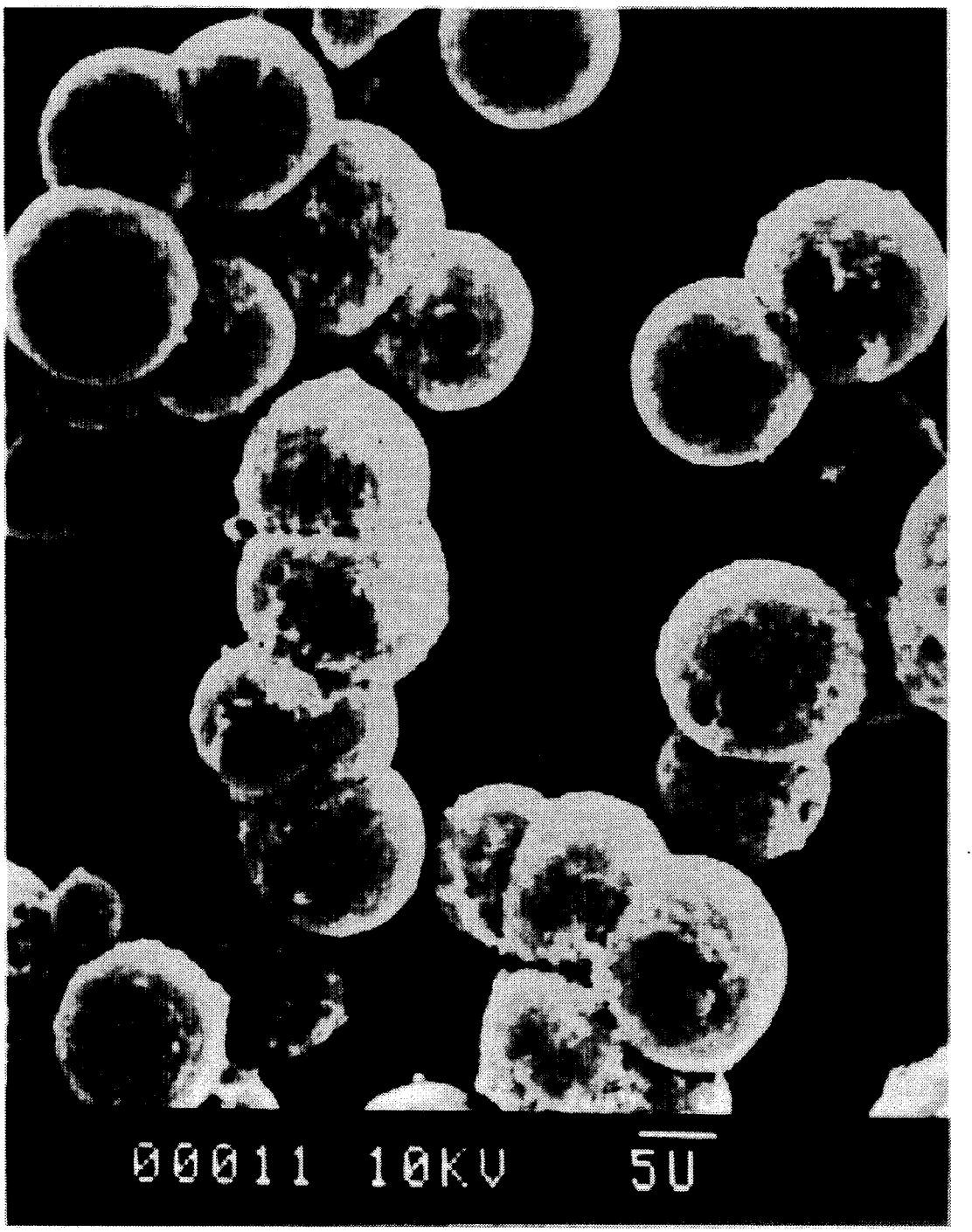
FIGS. 10A and 10B. SEM micrographs illustrating (A) clusters of aggregates before polymer removal and (B) clusters after polymer removal from the aggregates.
Figure 10B:
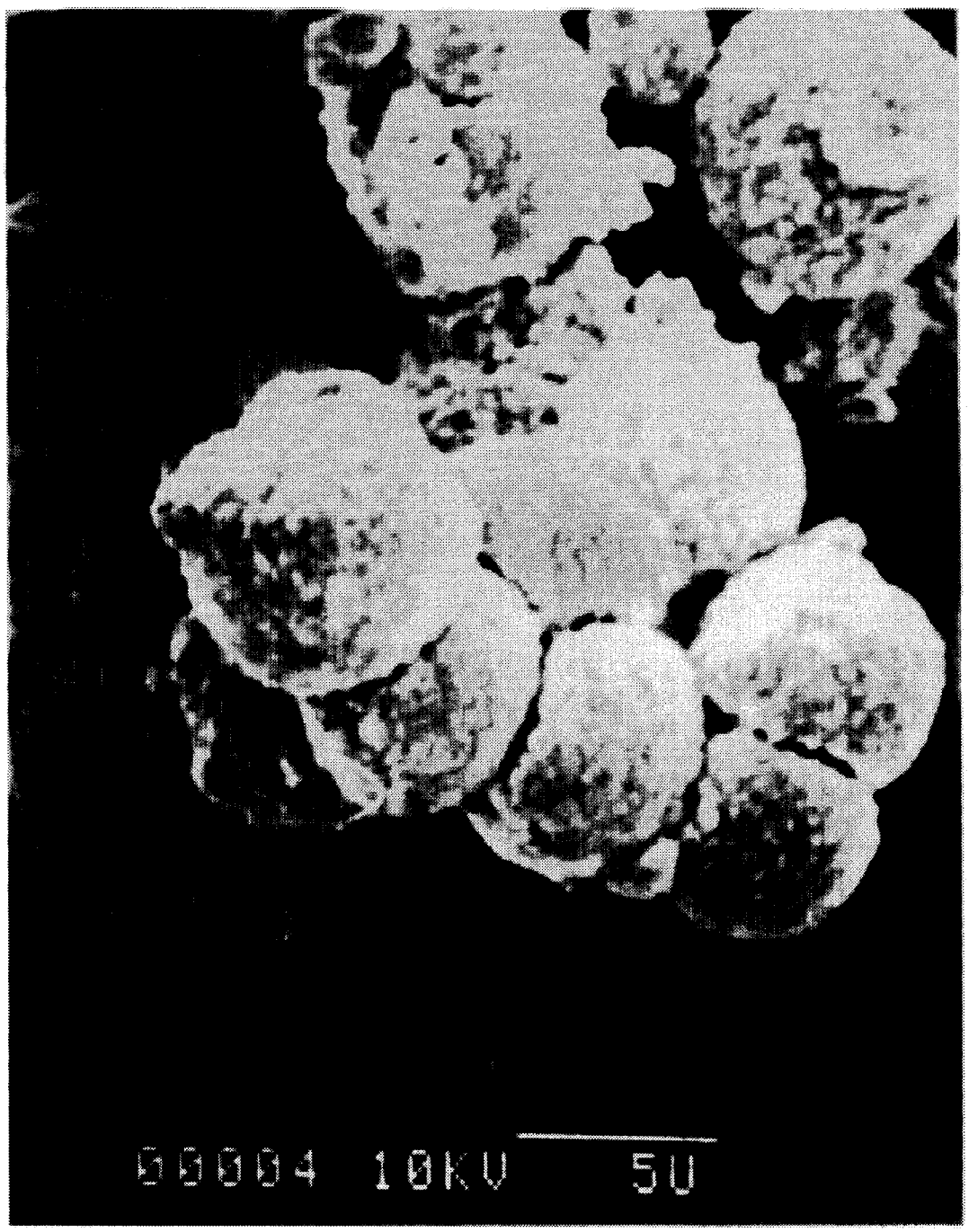

Mechanical agitation during particle growth inhibited clustering of the aggregates. In the absence of agitation, more than 70% of the aggregates formed clusters, as shown in FIG. 10A. Neither mechanical agitation nor polymer removal could disrupt the clusters once they are formed, as indicated in FIG. 10B. Using the reaction conditions reported above, the fraction of clustered particles was reduced to less than 10% of the total particles, with sufficient mechanical agitation. However, over-agitation or nonuniform agitation caused polydispersity. For this aggregation method, the optimal agitation corresponds to the minimum mechanical work necessary to maintain a homogeneous reaction mixture, without breaking weakly formed aggregates. A vibromixer equipped with a two inch diameter paddle operating at a low amplitude was used for this purpose.

Significant clustering of the aggregates also occurred during drying. Hard cakes formed when the particles were collected from a water suspension and dried at 60° C. Free-flowing powders, though, were obtained by suspending the particles in a polar organic solvent with a lower surface tension than water (e.g., isopropanol) prior to collecting and drying the particles.

Vacuum drying of the aggregates at 170° C. for 16 hours prior to combustion of the polymer at higher temperature aided in the prevention of cluster formation. It is believed that this mild heating allowed the urea-formaldehyde polymer to react completely, dry, and begin to pyrolyze, thus converting the polymer to a generally nonflowable state and reducing or preventing the formation of polymer connections between particles. Further polymer removal was accomplished by heating at a sufficiently low temperature (350° C.) to avoid abrupt combustion. Sudden exothermic combustion created holes and caves in the final $ZrO_2$ particles, as illustrated in FIG. 10B, by the explosive escape of combustion gases. Although such damage increased the surface area and average pore size (380 Å vs 210 Å), the particle strength was impaired. Moreover, when packed in a HPLC column at 5500 psi, particles burned at 550° C. broke into fragments, as observed by optical microscopy.

EXAMPLE 2

Effect of Polymerization Rate

A. Materials and Methods

Aqueous zirconia sol (pH 3.0), containing 20 wt-% $ZrO_2$ particles, was purchased from Nyacol Products, Inc. (Ashland, Mass.). The particle size distribution of the $ZrO_2$ colloids was determined by photon correlation analysis with a Coulter N4SD particle size analyzer using deionized water as the solvent. The reported wt-% particle size distribution is the average result of four analyses using a particle refractive index of 1.19 for the calculation. Pure urea, 37 wt-% aqueous formaldehyde, and methanol were purchased from Mallinckrodt Specialty Chemical Co., Fisher Scientific, and EM Science, respectively.

The porous zirconia samples used in this study were synthesized by the following procedure: 100 ml of $ZrO_2$ sol was added to a new 800 ml polypropylene beaker, the pH was adjusted to the desired value using concentrated nitric acid, and 7.5 g of urea was dissolved in the sol. With mixing using a vibromixer, 12.5 ml of 37 wt-% formaldehyde solution was added and the mixing was continued for an additional 30 seconds. After two hours of reaction, the sample was diluted to 700 ml total volume using deionized water and then homogenized by manual mixing. As noted above, there were two size-classes of aggregates that formed—micron and sub-micron. The micron-scale aggregates of colloids were separated by sedimentation, resuspended in 2-propanol, and collected by vacuum filtration. The resulting free-flowing powder was further dried at 90° C. in a convection oven for 12 hours to partially remove adsorbed 2-propanol and water.

A staged heating process was then used to remove the polymer and sinter the aggregates. The particles were first heated in a vacuum oven at 170° C. for 16 hours and then at 375° C. for two hours in a muffle furnace with sufficient air access to allow most of the carbon in the particles to be burned off. The temperature was raised to 750° C. for 6 more hours to generally completely burn off any remaining polymer. Finally, the particles were sintered at 900° C. for 3 hours to improve their mechanical strength.

The apparent-density of the composite and sintered particles were measured by weighing a volumetric flask before and after loading the sample. The sample was loaded in a minimum of four increments; after each, the flask was tapped for at least 30 seconds to assist in uniform packing of the particles. Each sample was allowed to equilibrate at room temperature in air for 6 hours before the determination of apparent density to ensure a constant degree of hydration during the measurements.

The reaction time necessary for urea-formaldehyde polymer beads to form in the absence of $ZrO_2$ colloids was determined by monitoring the absorbance of a reaction mixture with the same concentrations of urea and formaldehyde as in a typical synthesis experiment. The reaction mixture was prepared by: (1) dissolving urea in aqueous nitric acid of desired pH; (2) adding formaldehyde; and (3) quickly homogenizing. It was then transferred to a cuvette and placed in a Bausch & Lomb Spectronic 88 spectrophotometer ($\lambda$=500 nm) connected to a computer that collected the absorbance signal as a voltage every two seconds. The time at which particles formed in the presence of $ZrO_2$ sol was determined by viewing samples of the reaction mixture under a microscope. Changes in absorbance could not be used to determine the time of particle formation in this case because the $ZrO_2$ sol is opaque.

The wt-% of $ZrO_2$ in the particles before polymer removal was determined by thermogravimetric analysis in flowing air or nitrogen using a Perkin-Elmer TGA7 instrument. Nitrogen adsorption isotherms were collected at 77K on a Porous Materials Inc. (Ithaca, N.Y.) Automated BET Sorptometer. Scanning-electron micrographs (SEMs) were taken with a Hitachi 450 scanning-electron microscope.

Polymer adsorption data were collected by withdrawing 5 ml samples from standard reaction mixtures and diluting to 45 ml with deionized water. The samples were centrifuged for 10 minutes, the supernates were decanted and the precipitates were dried at 110° C. for one hour. The wt-% of polymer in the samples was determined by recording the weight of each sample before and after heating in a muffle furnace at 900° C. for 1 hour.

B. Results 1. pH Dependence on Particle Mechanical Strength

Figure 11:
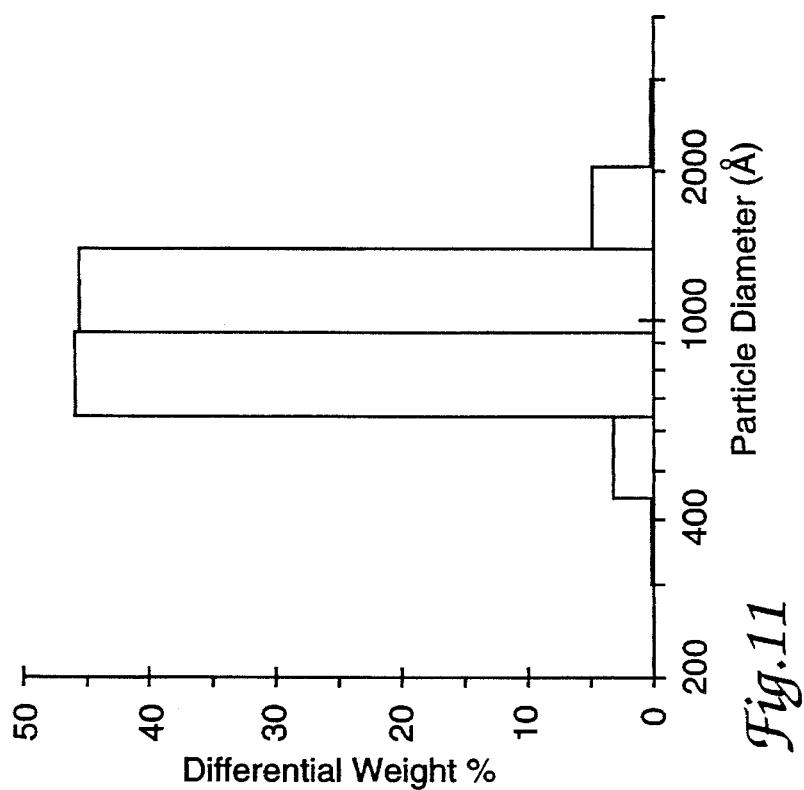
FIG. 11. Particle size distribution of $ZrO_2$ colloids used in Example 2, determined by photon correlation spectroscopy.

The particle colloid size distribution of the starting colloids (as purchased from Nyacol and subsequently centrifuged, but before any PICA processing) is shown in FIG. 11; the mean diameter is near 1000 Å. Aggregates were prepared at pH values between 3.0 (the original sol pH) and 0.8. TGA traces were collected to quantify the wt-% of water, urea-formaldehyde polymer, and $ZrO_2$ in each sample. Near pH 1.5 the $ZrO_2$ content (FIG. 12A) went through a maximum and the wt-% of polymer (FIG. 12B) went through a minimum. When the sol pH was higher than 1.4 the resulting sintered particles had adequate mechanical stability to withstand packing into HPLC columns at 5500 psi, but when the sol pH was 1.4 or lower, the resulting particles could not withstand column packing. For example, FIG. 13 shows the flow rates of a dispersing solvent (2-propanol) for particles synthesized at pH 1.2 and 3.0. The consistently lower solvent flow rates for particles synthesized at pH 1.2 demonstrated column plugging by fines formed from broken particles. The materials from the pH 1.2 sol also provided very poor column efficiency, showing highly distorted elution peaks.

Figure 14:
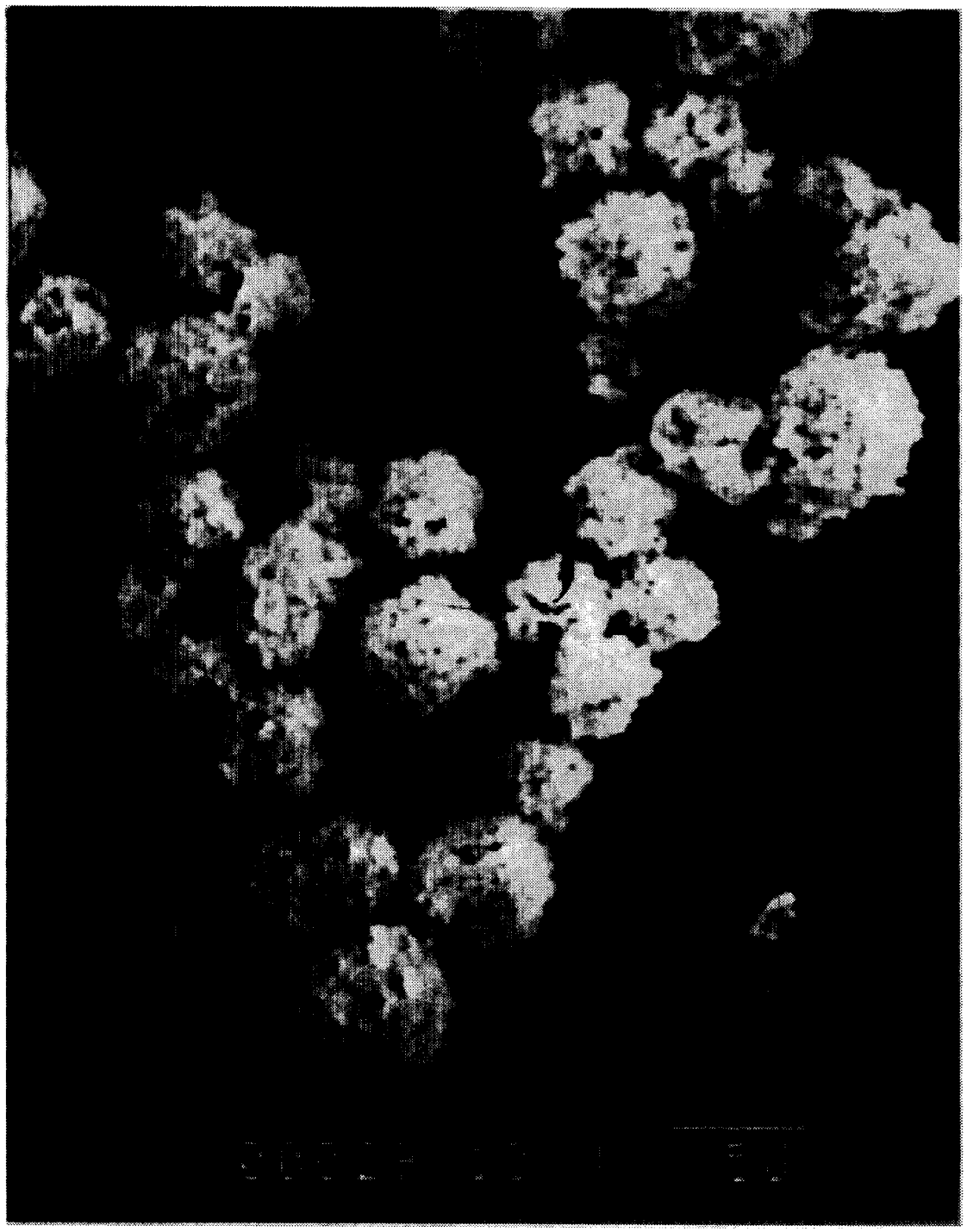
FIG. 14. An SEM micrograph of sintered, porous $ZrO_2$ particles synthesized at pH 0.8.
Figure 15:
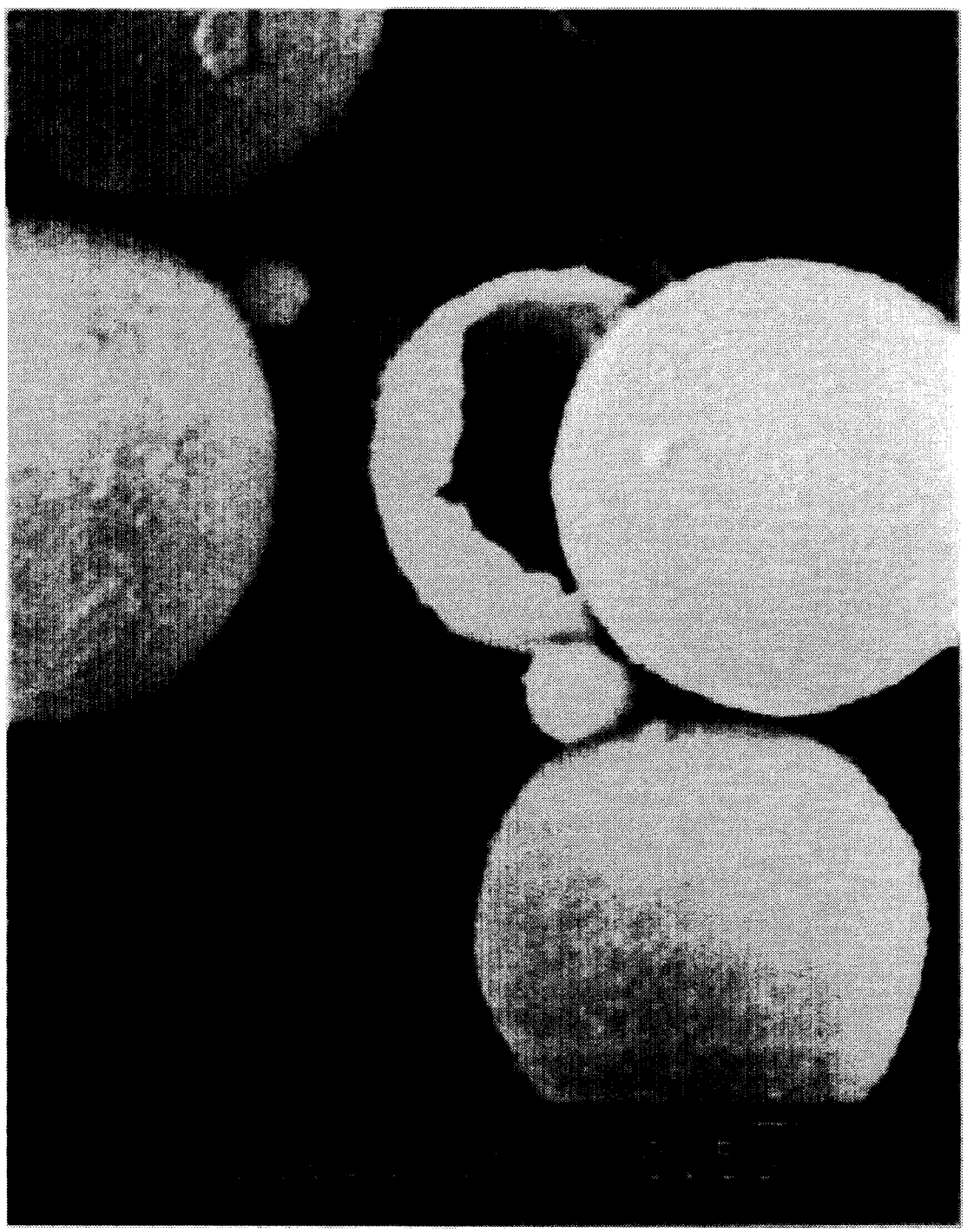
FIG. 15. An SEM micrograph of sintered, porous $ZrO_2$ particles synthesized at pH 1.2.
Figure 16:
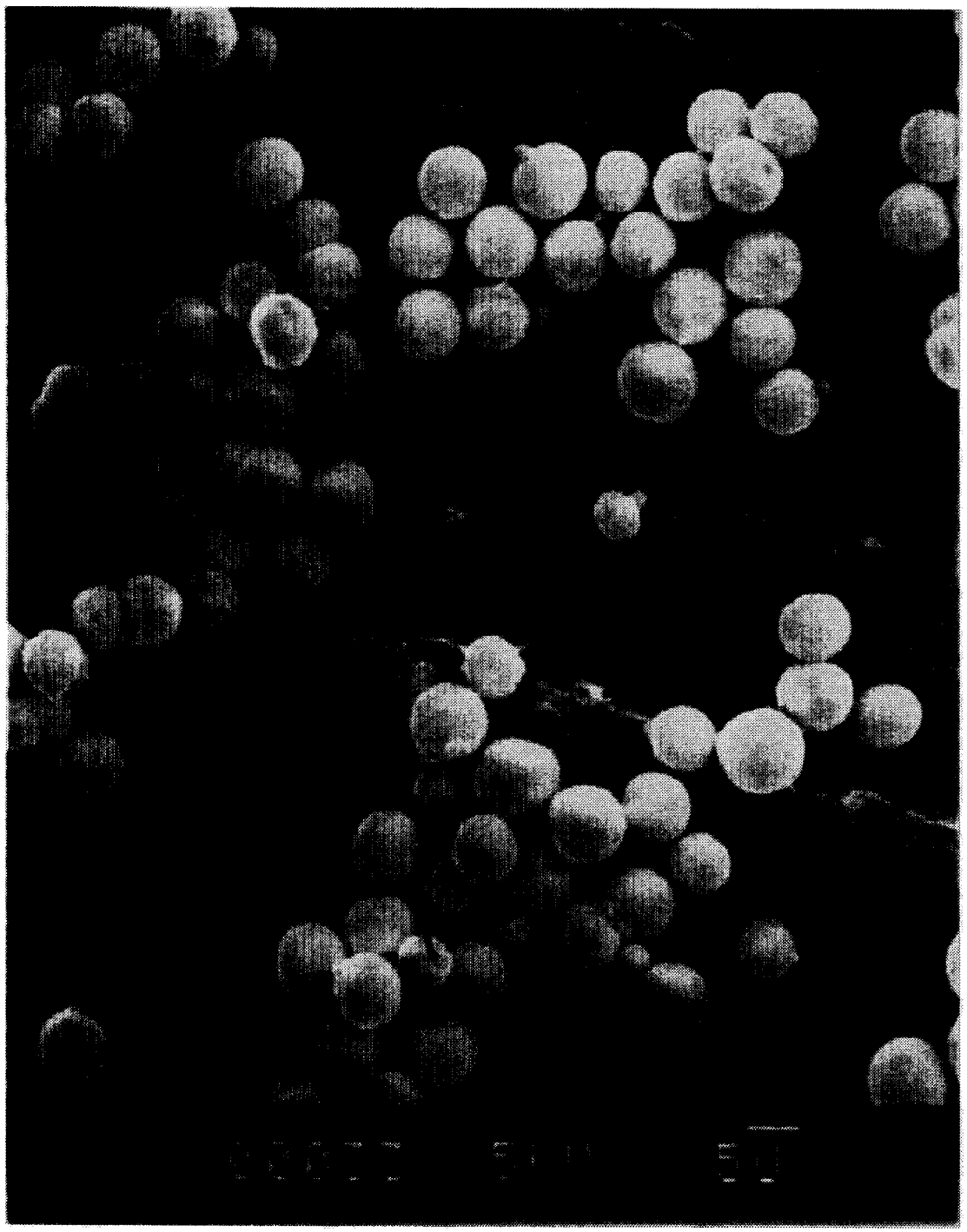
FIG. 16. An SEM micrograph of sintered, porous $ZrO_2$ particles synthesized at pH 3.

FIG. 14 shows a micrograph of particles prepared at pH 0.8; they appear to be composed of very loosely packed submicron aggregates. FIG. 15 shows a micrograph of a sintered sample that was synthesized at pH 1.2. It is apparent that some particles are hollow spheres. Particles synthesized at pH 1.4 also could not withstand packing in an HPLC column at 5500 psi, although no broken shells were observed by SEM. In contrast, a SEM micrograph of a sintered sample synthesized at pH 3 (FIG. 16) shows no broken shells. These could be easily packed in an HPLC column at 5500 psi.

2. pH Dependence on Apparent Density, Composition, and Yield

Figure 12A:
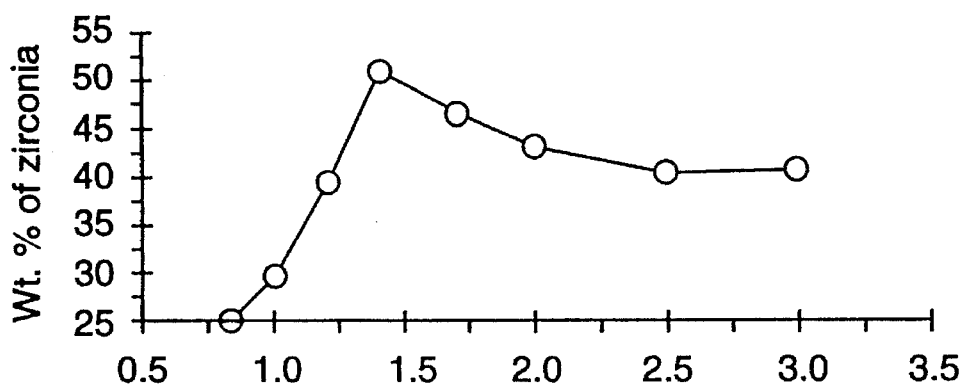
FIG. 12. As a function of sol pH: (A) wt-% of $ZrO_2$, (B) wt-% of urea-formaldehyde polymer and (C) apparent density of the micron-scale particles before polymer removal (g/cc); (D) yield and (E) apparent density of sintered, micron-scale particles (g/cc). The wt-% data correspond to dehydrated samples.

The plot of apparent density of the composite aggregates ($\rho_{app,composite}$, FIG. 12C) is in good agreement with the wt-% of $ZrO_2$ in the particles determined by TGA (FIG. 12A). This verifies the existence of the maximum and confirms that the apparent density measurements are representative of particle density. The yield of micron-scale, sintered $ZrO_2$ particles (FIG. 12D) also goes through a maximum near pH 1.5. The apparent-density of sintered particles ($\rho_{app,sintered}$) is shown in FIG. 12E; above pH 1.4 the apparent density was found to be very similar to that obtained by packing a HPLC column at high pressure with 2-propanol as the dispersing solvent. Below pH 1.4 there is a dramatic drop in apparent density of sintered particles, which is consistent with SEM micrographs of particles synthesized at pH 0.8 (FIG. 14) and pH 1.2 (FIG. 15).

It is interesting to compare the apparent density of the composite and sintered particles. On either side of pH 1.5 the polymer content of the composite particles increased, so the apparent density decreased since $ZrO_2$ is more dense than UF polymer. However, upon sintering the apparent density increased monotonically with pH.

3. pH Dependence on Particle Formation and Polymer Adsorption

Figure 17:
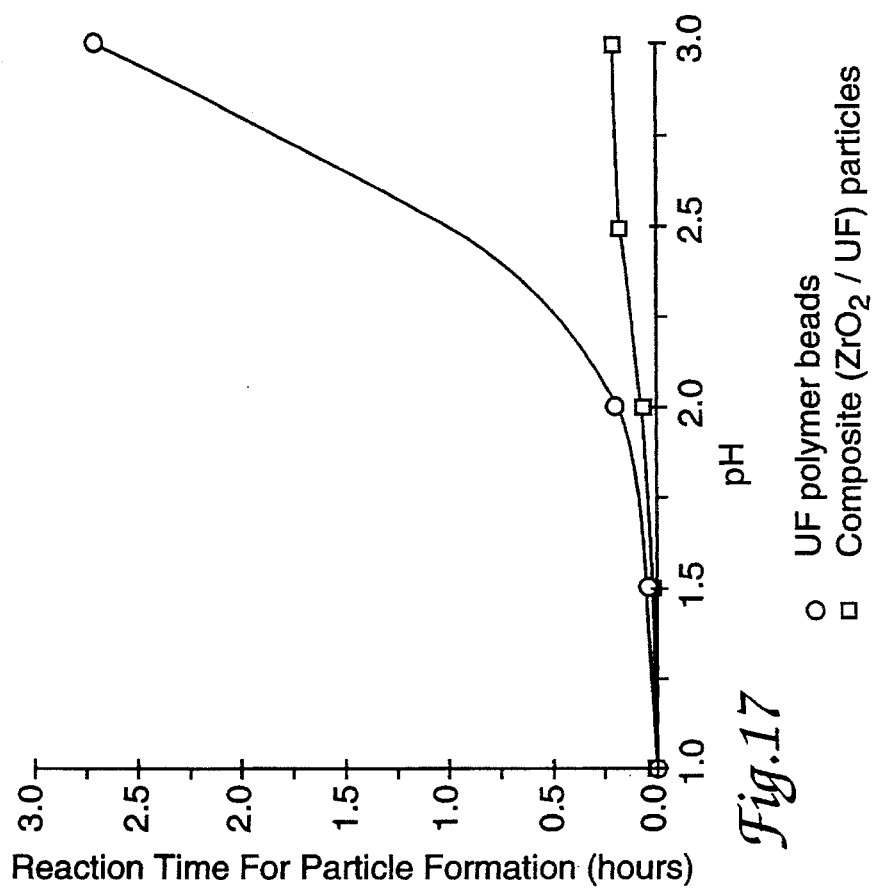
FIG. 17. The time of UF polymer bead formation and $ZrO_2$/UF spherule appearance as a function of pH.

The time of particle appearance during the polymerization of urea and formaldehyde, in both the presence and absence of $ZrO_2$ sol, is shown in FIG. 17. That both particle formation rates change in the same manner with pH suggests that the aggregate growth is governed by polymerization kinetics. Below pH 1.5, the $ZrO_2$/polymer particle formation rate is similar to that of the polymer alone. Above pH 1.5, though, the rate of $ZrO_2$/polymer particle formation diverges from the rate of precipitation of polymer alone. Between $2.5 \leq pH \leq 3.0$, the time of composite particle ($ZrO_2$/UF) appearance increased by a factor of only 1.1, while that for UF polymer-bead formation increased by a factor of 2.7. In this pH range polymerization was slow so the concentration of polymer in solution was low.

Figure 18:
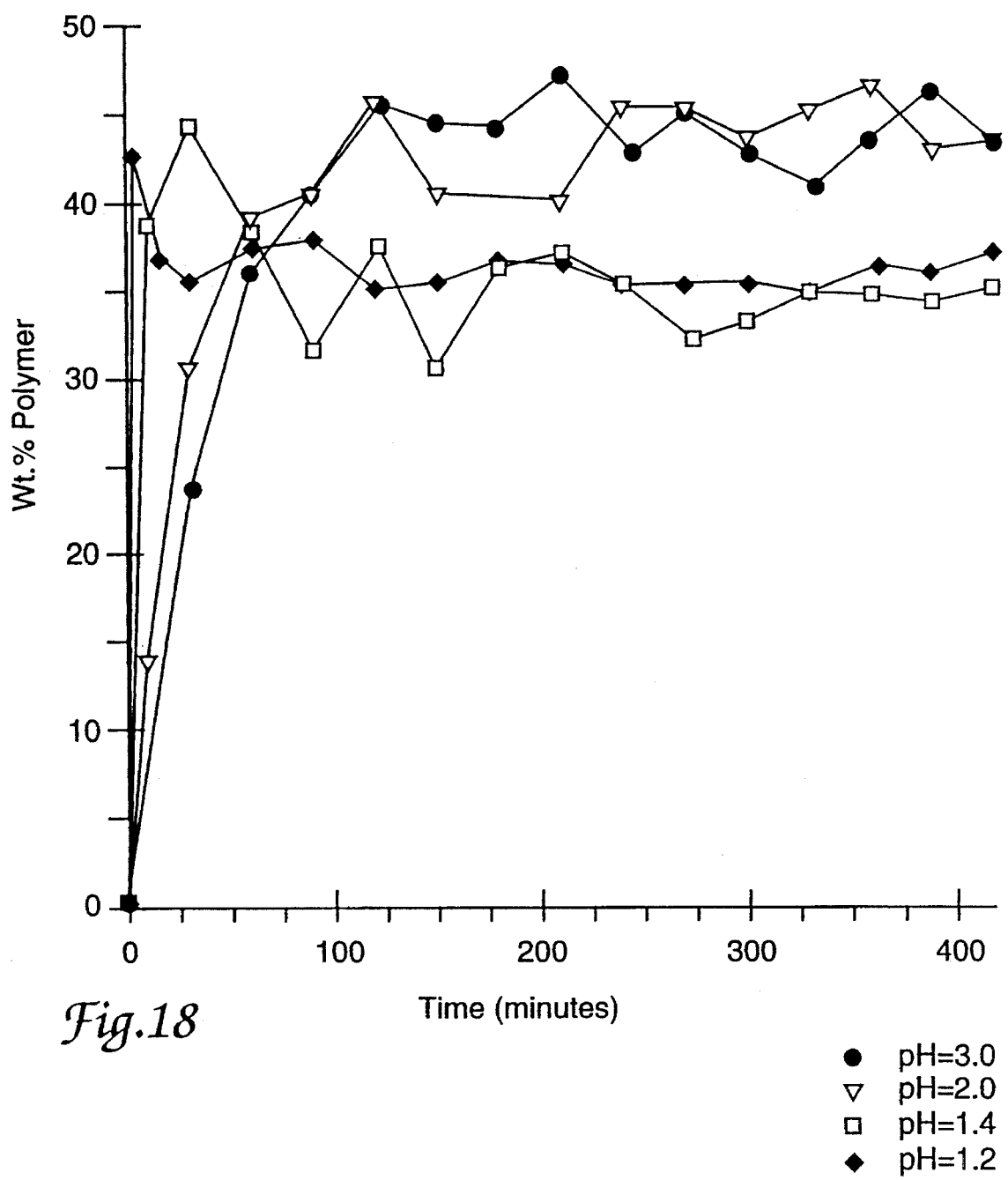
FIG. 18. Adsorption of polymer onto $ZrO_2$ colloids at pH 3, 2, 1.4 and 1.2 as a function of reaction time.
Figure 19A:
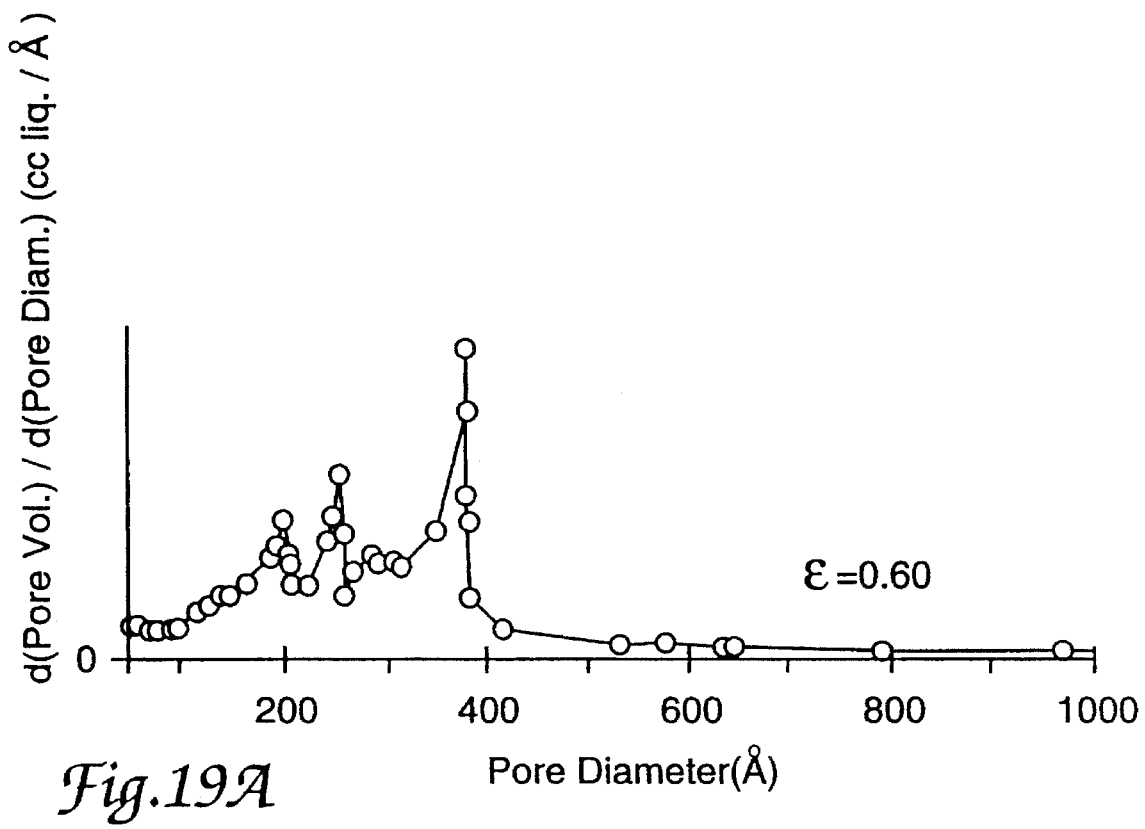
FIG. 19. Pore size distributions after sintering from nitrogen adsorption for particles synthesized at various pHs: (A) 1.2, (B) 1.4, (C) 2.0 and (D) 3.0.
Figure 19B:
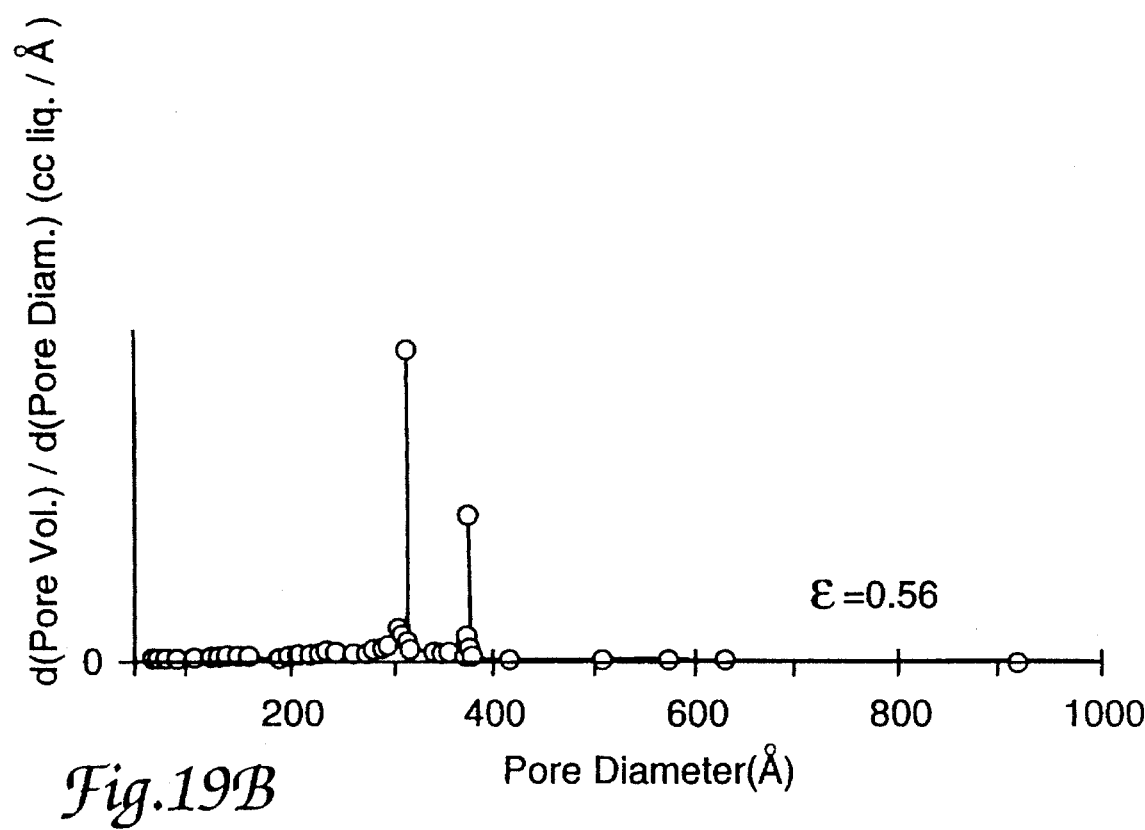
Figure 19C:
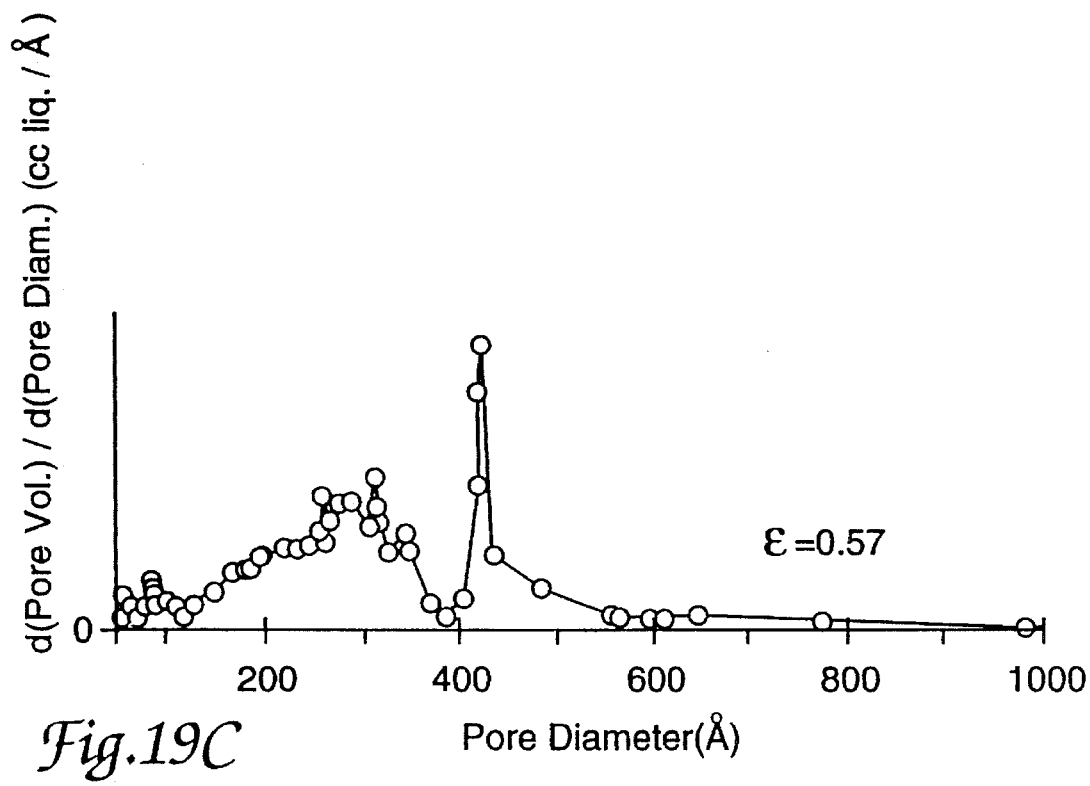
Figure 19D:
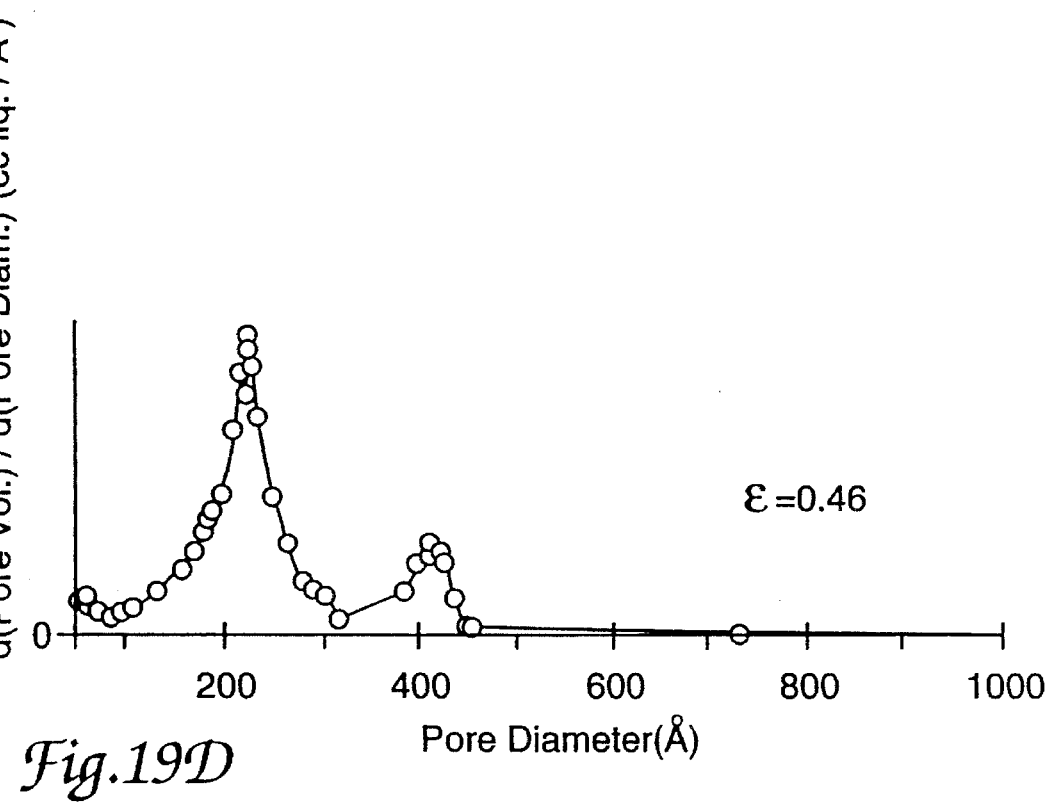

FIG. 18 shows the wt-% of UF polymer in the composite particles collected by centrifugation using a range of pHs. Aggregates were observed in the microscope after 15 minutes of reaction yet the wt-% polymer on these aggregates was only a small fraction of the final coverage after 4 hours of reaction. The wt-% of polymer in the particles continued to increase long after particles were first observed in the microscope (FIG. 17), indicating that there must be a concentration gradient of UF polymer in the particles. As the pH was decreased from 2.5 to approximately 1.4 the rate of polymer growth increased. Therefore, there was less time for polymer adsorption onto colloids before aggregation, so a continual decrease in the polymer content of the composite particles was observed. However, while fewer polymer segments adsorb onto the colloids before aggregation, the molecular weight of the adsorbed polymer was larger. Below pH 1.5 the rate of polymer growth was high enough that, even before adsorption occurred, polymer beads were able to nucleate. Later, polymer covered colloids connected with these beads to form a shell. As the pH decreased the wt-% of zirconia in the composite particles approached that in the reaction mixture (approximately 20 wt-%). This suggested that the mechanism of $ZrO_2$ incorporation in the composites at below pH 1.5 under the conditions of this experiment resembles a physical entrapment process in which polymer adsorption is diminishingly important.

Figure 12B:
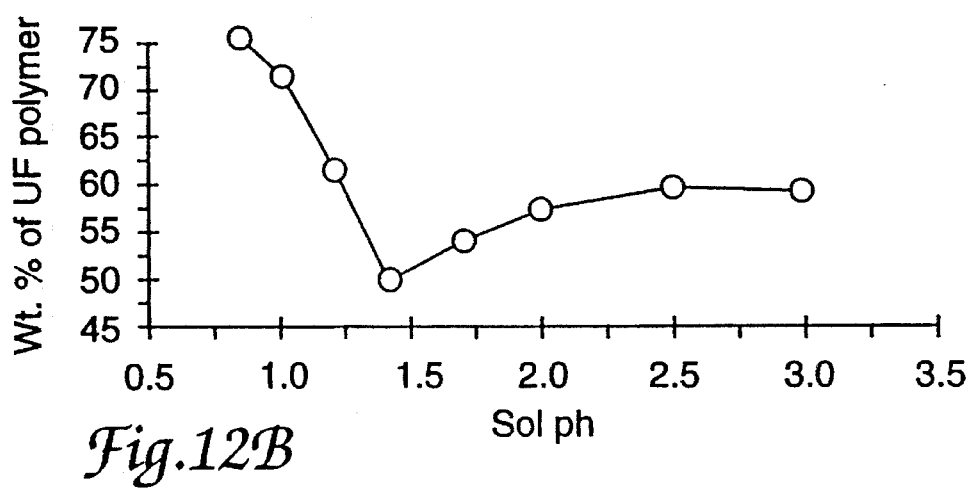
Figure 12C:
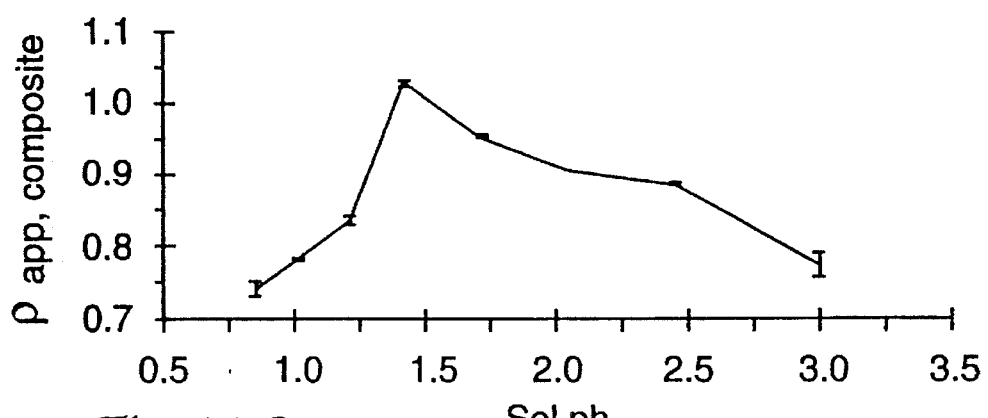
Figure 12D:
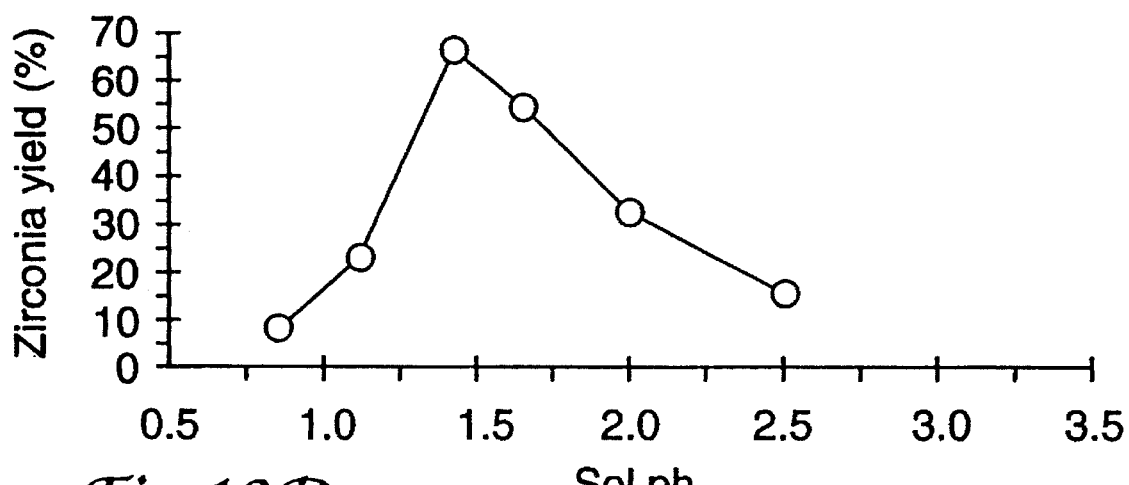
Figure 12E:
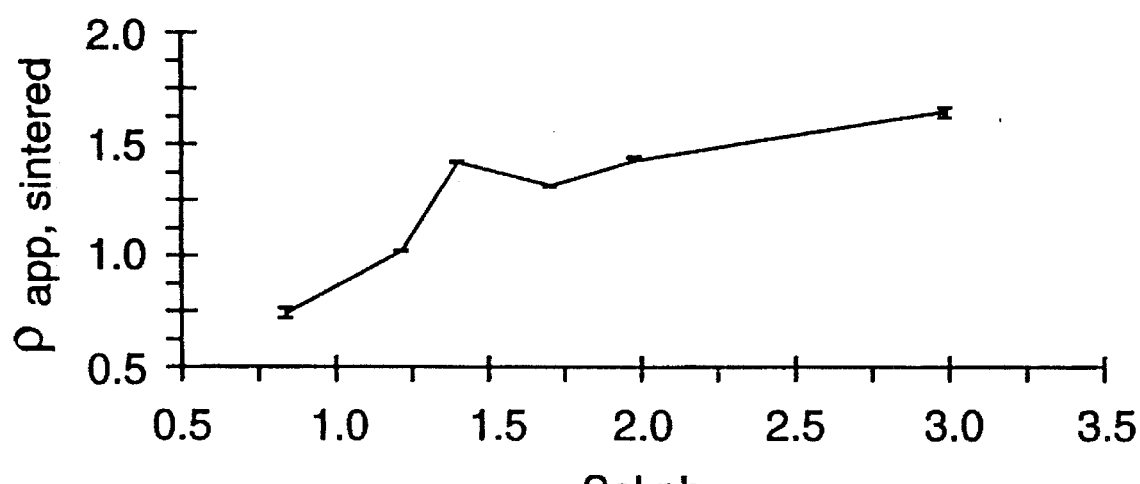
Figure 13:
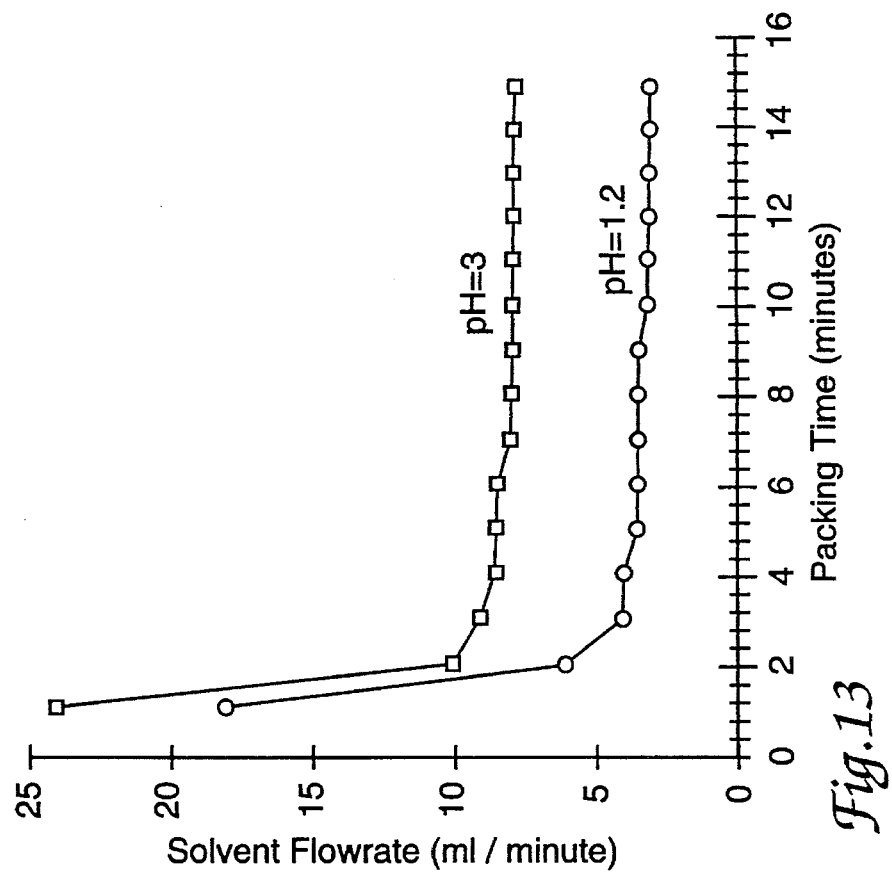
FIG. 13. Packing-solvent flow rate profiles for particles synthesized using pH 3.0 and pH 1.2 sols. For both samples the packing setup, the column length (5 cm) and the $ZrO_2$ concentration in the slurry were the same and the packing pressure was 5000 psi.

While there was good qualitative agreement between FIG. 18 and FIG. 12B, at all pH values the wt-% of polymer after 400 minutes of reaction in FIG. 18 was somewhat lower than in FIG. 12B. This was probably due to differences in the methods of sample collection. The data in FIG. 12 are for the micron-scale particles which were separated from the reaction mixture by repeated sedimentation-decanting sequences whereas the data in FIG. 18 were for samples collected by centrifugation, and so will contain $ZrO_2$/polymer particles as well as some unreacted colloid. The unreacted colloid can serve to lower the measured wt-% of polymer in the sample.

4. Pore Characterization

The pore-size distributions (psd's) after sintering are shown in FIG. 19. All samples exhibited multimodal psd's with pore diameters ranging between 100 Å and 450 Å. The sample synthesized at pH 1.2 contained some hollow particles but its psd seemed qualitatively similar to those of samples synthesized at higher pH (non-hollow particles). This is because $N_2$ adsorption only probes the pores within the $ZrO_2$ shells and not the large voids they encompass. Surface areas and porosities ($\epsilon_{particle}$) for these samples are listed in Table 3. Note that there is qualitative agreement with FIG. 12E, but quantitative agreement is not expected since condensing $N_2$ cannot be used to distinguish between hollow cores and interstitial volume between aggregates. The $N_2$ psd's show that the higher the pH, the greater contribution of small pores to the total porosity.

TABLE 3

| Pore Characterization Data as a Function of Sol pH | | |
|---|---|---|
| Sol pH | Fractional Particle Porosity ($\epsilon_{particle}$) | Surface Area ($m^2$/g) |
| 1.2 | 0.60 | 27 |
| 1.4 | 0.56 | 36 |
| 2.0 | 0.57 | 30 |
| 3.0 | 0.46 | 28 |

5. Particle Shrinkage

The degree of particle shrinkage generally mimicked the variation of the wt-% polymer in the composites (FIG. 12B) as the pH was varied. Shrinkage due to polymer removal alone cannot explain the shrinkage factor results. The variation in the shrinkage factor with pH also reflects the different colloid packing structures that formed under different aggregation conditions. A minimum shrinkage near pH 1.5 indicates that the packing structure formed at this pH was very stable. Lange has addressed pore shrinkage during sintering in terms of the pore coordination number, R, which is defined as the number of touching particles forming a pore B. J. Kellett and F. F. Lange, J. Amer. Ceram. Soc., 72 (5), 725 (1989)). Pore shrinkage will be greater in pores where R is less than a critical pore coordination number $R_c$ than in pores where $R > R_c$; $R_c$ is related to the ratio of the surface energy per unit area of grain boundaries and particle surfaces. Since sintering results in densification of the particles, there must also be concomitant particle shrinkage. Based on the work of Lange, near the optimum pH the colloid packing structure must consist of pores that have higher coordination numbers than those formed on either side of the optimum pH. Variation in the colloid packing structure of the sintered aggregates with pH is also reflected in the relative mechanical strength of these aggregates.

EXAMPLE 3

Continuous Flow PICA

A. Materials and Methods

Zirconia sol, containing 20 wt-% $ZrO_2$, nominally 1000 Å in diameter, dispersed in aqueous nitric acid, was purchased from Nyacol Products, Inc. The pH of the sol can vary and is specified in each of the following examples. Urea and formaldehyde (37 wt-% in water and methanol) were obtained from Mallinckrodt Specialty Chemical Co. and Fisher Scientific, respectively.

Figure 20:
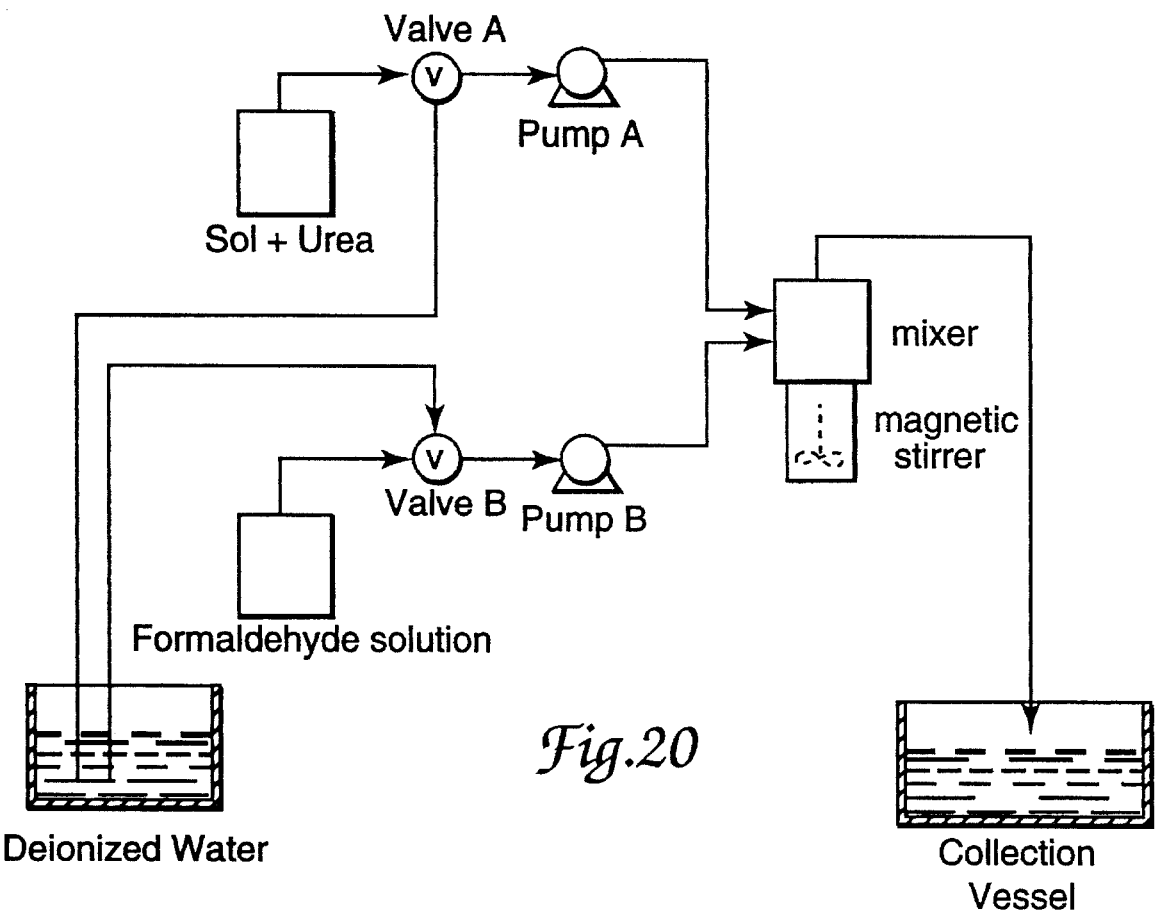
FIG. 20. A schematic of a continuous flow reactor.

The reactor geometry for one version of a continuous flow reactor (continuously stirring reactor) is shown in FIG. 20. Pumps A and B were calibrated such that the flow rates were 204.5 ml/minute and 23.4 ml/minute, respectively. With pumps A and B operating, the reactor system was flushed with deionized water by configuring valves A and B such that fluid was drawn from the water reservoir. Once the system was flushed, pumps A and B were turned off. The reactant streams to the atmosphere were opened and valves A and B were configured such that these streams served as the inlets to the pumps. The reactor system was purged with air by turning on the pumps. A bucket of deionized water was placed beneath the reactor system exit to collect the product and quench any further reaction.

Urea (37.5 mls) was dissolved in 500 mls of pH 1.2 $ZrO_2$ sol. The inlet tube to pump A was placed in this solution. The inlet tube to pump B was placed in 63 mls of formaldehyde and then sealed in place around the formaldehyde solution container using parafilm. Each pump was used to move the reactant stream fronts to the opening of the mixer but not into the mixer. The pumps were then shut off. The mixer was then started and then the pumps were simultaneously turned on to begin the continuous flow reactor system. Immediately after the reactant reservoirs were emptied, valves A and B were adjusted such that the reactor system was thoroughly flushed with deionized water. After flushing, the pumps were turned off and the product was collected from the collection vessel as described below.

As in the batch processes described above, two sets of particles were formed. The micron-scale particles were separated from the submicron diameter colloids by a sedimentation, decanting, and resuspension sequence. The micron-scale particles were resuspended in 2-propanol and collected by vacuum filtration. A staged heating process was used to remove the polymer and sinter the aggregates. The particles were first heated in a vacuum oven at 170° C. for 16 hours and then at 375° C. for 2 hours in a muffle furnace with sufficient air access to allow most of the polymer in the particles to be burned off. The temperature was raised to 750° C. for 6 more hours to completely burn off any remaining polymer. Finally, the particles were sintered at 900° C. for 3 hours to improve their mechanical strength.

B. Results

The particles collected had a narrow size distribution, approximately 5 μm in diameter. The particle morphology and pore size distribution (psd) of sintered $ZrO_2$ particles prepared by this method are similar to the particle morphology and psd of the particles shown in FIGS. 15 and 19A, respectively.

EXAMPLE 4

Continuous Flow PICA

Effect of Residence Time on Particle Size Distribution

A. Materials and Methods

Figure 21:
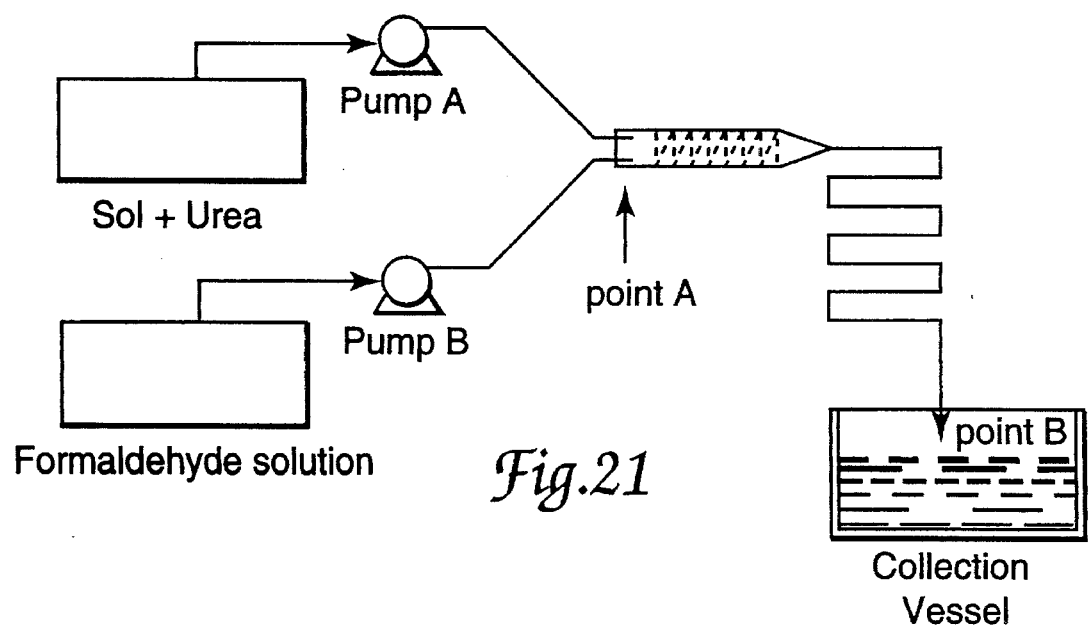
FIG. 21. A schematic of an alternative embodiment of a continuous flow reactor.

The reactor geometry for an alternative version of a continuous flow reactor system (plug flow reactor) is shown in FIG. 21. Zr100/20 sol (pH 2.8) was adjusted to pH 1.7 using concentrated nitric acid. Pumps A and B were calibrated to the desired flow rate using deionized water. The in-line mixer is referred to herein as a plug-flow reactor (PFR). The plug flow reactor residence time was set to the desired valve by adjusting the length of the tubing which serves as the PFR. Reaction mixture A was prepared by diluting the pH 1.7 sol with the appropriate amount of pH 1.7 aqueous nitric acid. Next, the necessary urea was dissolved in the diluted sol. Reaction mixture B was stock 37 wt-% formaldehyde solution. The reactor system was primed by flowing each reactant up to, but not into, the fitting in which the reactant streams were merged. The continuous-flow reactor system was started by simultaneously turning on pumps A and B. The product was collected and diluted in a vessel containing deionized water. After the reactant reservoirs were emptied, the system was purged with deionized water by placing the reactant inlet tubes into a reservoir of deionized water. The product was collected by the process described above.

Listed in Table 4 are the specific reaction conditions for three runs.

TABLE 4

| | | Reaction Conditions | | |
|---|---|---|---|---|
| Runs | Residence Time (minutes) | Pump | Flow Rate (ml/min) | Contents |
| 1 | 14.8 | A | 12.6 | 25 vol-% pH 1.7 sol in pH 1.7 $HNO_3$; 9.5 g urea per liter of sol |
| | | B | 0.2 | 37 wt-% formaldehyde soln. |
| 2 | 22.5 | A | 12.6 | 25 vol-% pH 1.7 sol in pH 1.7 $HNO_3$; 9.5 g urea per liter of sol |
| | | B | 0.2 | 37 wt-% formaldehyde soln. |
| 3 | 29.0 | A | 12.6 | 25 vol-% pH 1.7 sol in pH 1.7 $HNO_3$; 9.5 g urea per liter of sol |
| | | B | 0.2 | 37 wt-% formaldehyde soln. |

B. Results

Figure 22:
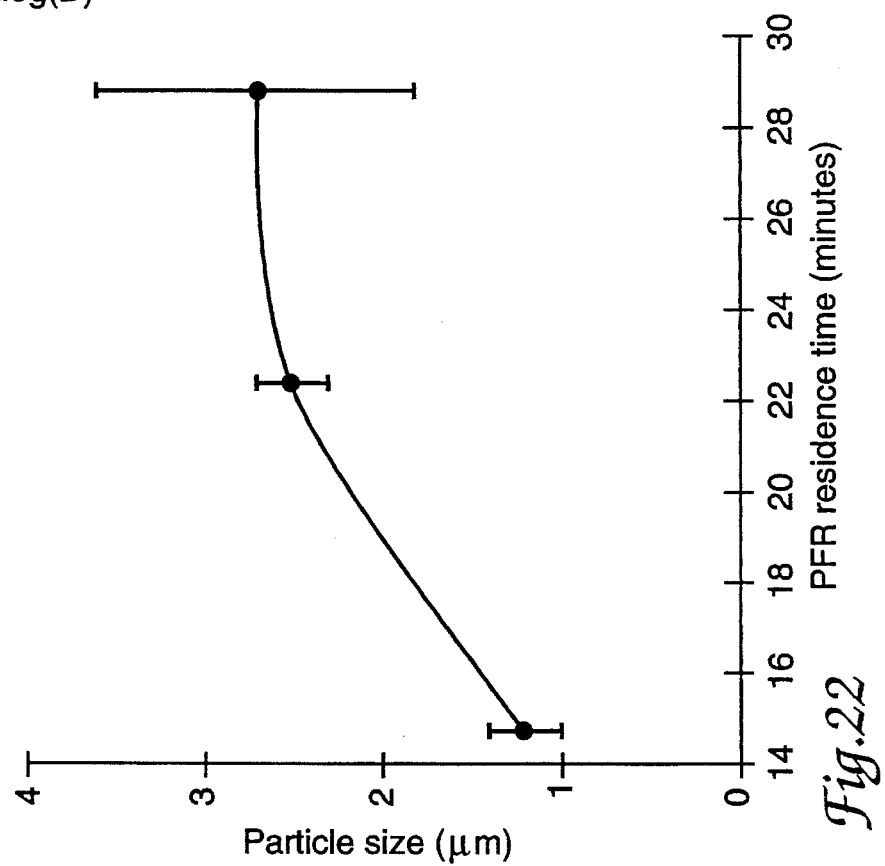
FIG. 22. Particle size dependence on residence time in continuous flow reactor.

In these runs, the effect of residence time on the particle size distribution was evaluated. The results are shown graphically in FIG. 22 for the composite ($ZrO_2$/polymer) particles. This demonstrates that one can control the particle size by changing the residence time independently of composition.

EXAMPLE 5

Continuous Flow PICA Using Multiple Reactors in Series

A. Materials and Methods

Aqueous zirconia sol (pH 3.0), containing 20 wt % $ZrO_2$ particles, was purchased from Nyacol Products, Inc. (Ashland, Mass.). It was adjusted to pH 1.7 with concentrated nitric acid (EM Science). Urea (Mallinckrodt Specialty Chemical Co.), 37 wt-% formaldehyde in water and methanol (Fisher Scientific) were also used.

Attempts at synthesizing porous zirconia spheres in a continuous flow process were carried out using the following procedure. Into a first reactor, e.g., either a new polypropylene beaker for a continuously stirred reactor (CSTR) or polypropylene tubing for a plug flow reactor (PFR), was fed a mixture of diluted $ZrO_2$ sol and urea. Also added to the first reactor was a stream of 37 wt-% formaldehyde. The mixture was then pumped either to a second reactor, either a CSTR or PFR, or to a polypropylene collection vessel. In the cases where a second reactor was used, another stream of formaldehyde and a stream of concentrated urea solution were added to it. The reactor contents were then pumped to a collection vessel containing deionized water. For some runs, the zirconia sol needed to be diluted with pH 1.7 nitric acid. This nitric acid solution was made by adjusting the pH of deionized water with concentrated nitric acid, as measured by a pH meter from Orion Research Inc. The zirconia sol was then diluted to 25% by volume. The residence times in the reactors were fixed by controlling the volume of the reaction mixture in the reactor. A summary of each of the runs that were made are given in FIGS. 27–29. The reactor system of FIG. 27 (one CSTR) was used in Run 1. The reactor system of FIG. 28 (two CSTRs in series) was used in Runs 2–3. The reactor system of FIG. 29 (one PFR and one CSTR in series) was used in Runs 4–5.

Figure 28:
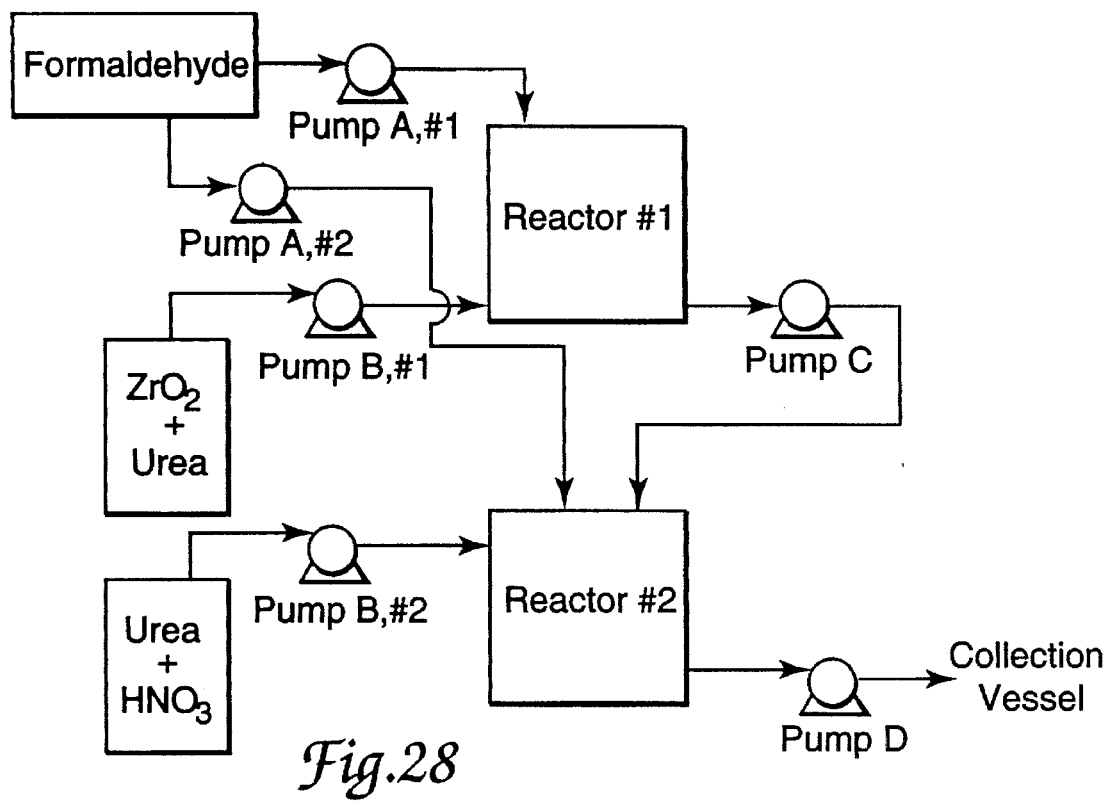
FIG. 28. Reactor system used in Runs 2 and 3 (two CSTRs in series) of Example 5.
Figure 29:
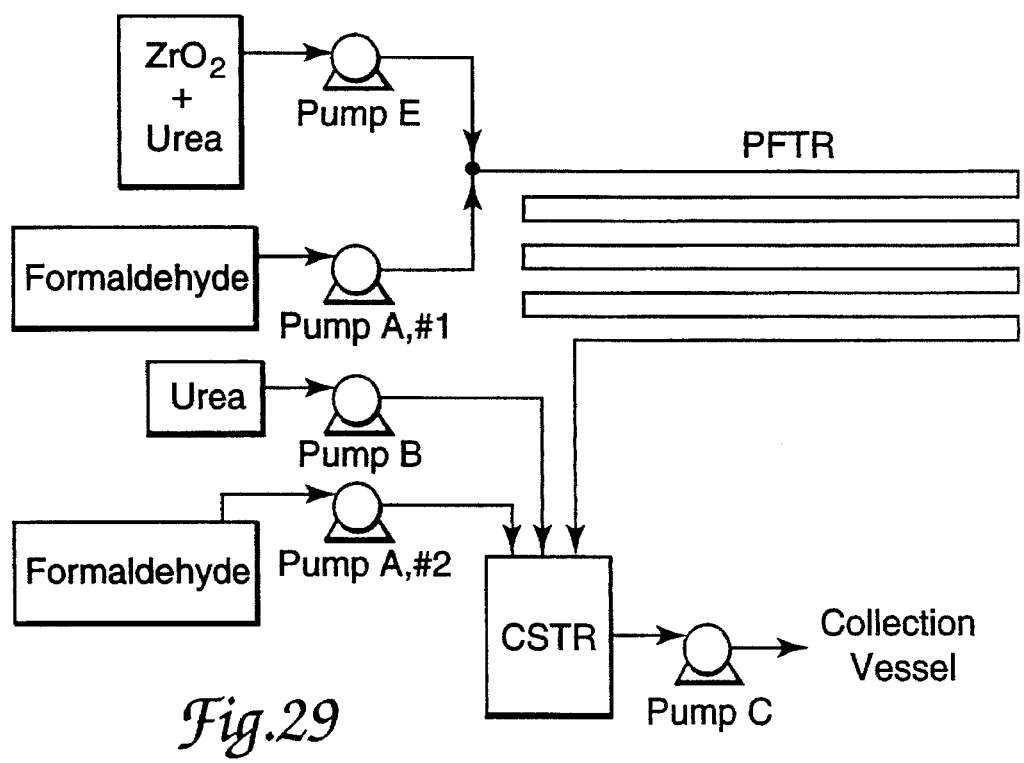
FIG. 29. Reactor system used in Runs 4 and 5 (one PFR and on CSTR in series) of Example 5.

In the experiments using the reactor systems of FIG. 28 (Run 3) and FIG. 29 (Runs 4 and 5), attempts were made to isolate the nucleation and aggregation growth steps. In both systems, $ZrO_2$ was provided to the first reactor with only an initial amount of urea and formaldehyde. The nuclei that were formed as well as unreacted $ZrO_2$ passed into a second reactor, where more urea and formaldehyde were provided. The goal was to create conditions in the second reactor wherein no further nucleation occurred; rather only growth onto the nuclei from reactor 1.

Figure 27:
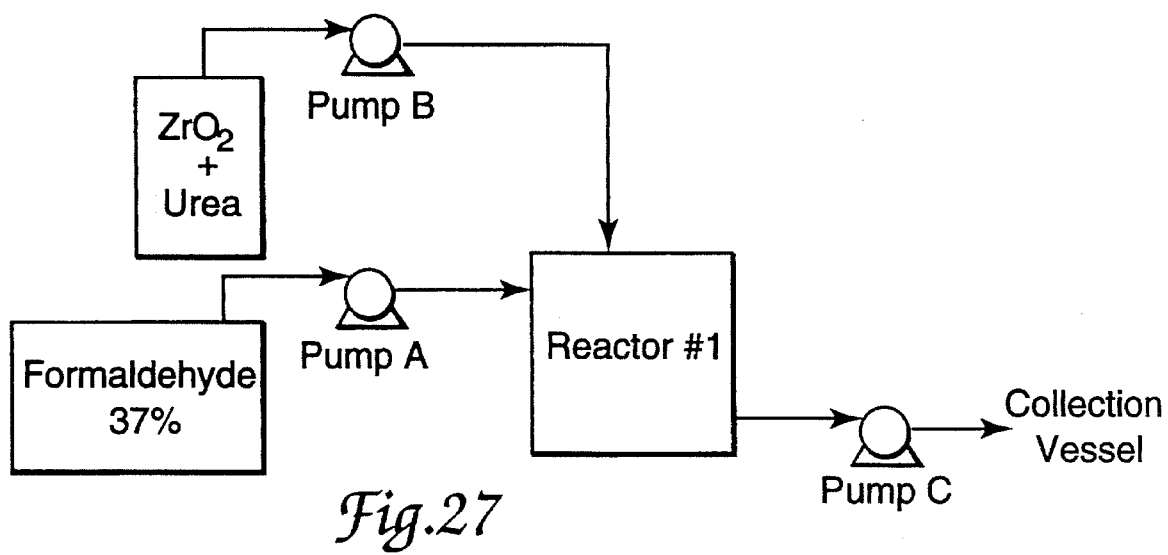
FIG. 27. Reactor system used in Run 1 (one CSTR) of Example 5.

Run 1 (FIG. 27)

In this experiment, the batch method was adapted to a continuous flow method. The reactor residence time (15 minutes) was close to that of the residence time in a batch method. The particles produced in this experiment were similar in size to those made in a batch reactor, i.e., 5 μm spherules, but the size distribution was wider because of the residence time distribution characteristics of this reaction scheme. Typical successful operating conditions were as follows.

| Pump | Head | Flow Rate (ml/min) | Contents |
|---|---|---|---|
| A | 1 | 0.20 | 37% formaldehyde |
| B | 1 | 4.67 | $ZrO_2$ sol + 25.8 g/l urea |
| C | 1 | 4.82 | Contents of Reactor #1 |

Run 2 (FIG. 28)

In this experiment, the reactor system of FIG. 27 was modified to attempt to increase the $ZrO_2$ yield by providing extra reactant. The residence time for reactor 1 was 15 minutes, and that for reactor 2 was 25 minutes. The particles produced in this experiment were similar to those made in Run 1 using FIG. 27. Typical successful operating conditions were as follows.

| Pump | Head | Flow Rate (ml/min) | Contents |
|---|---|---|---|
| A | 1 | 0.18 | 37% formaldehyde |
| A | 2 | 0.83 | 37% formaldehyde |
| B | 1 | 4.65 | $ZrO_2$ sol + 25.8 g/l urea |
| B | 2 | 4.65 | 109 g/l urea + $H_2O$ |
| C | 1 | 4.83 | Contents of Reactor #1 |
| D | 1 | 10.3 | Contents of Reactor #2 |

Run 3 (FIG. 28)

In this experiment, nucleation of the aggregates occurred in reactor and growth in reactor 2. The residence times of reactors 1 and 2 were 30 minutes each. The effluent from the continuosusly stirred reactor 1 contained aggregates that were about 1 μm in diameter. In the second continuously stirred reactor, these aggregates grew to 4 μm.

| Pump | Head | Flow Rate (ml/min) | Contents |
|---|---|---|---|
| A | 1 | 0.18 | 37% formaldehyde |
| A | 2 | 0.18 | 37% formaldehyde |
| B | 1 | 12.54 | 25% $ZrO_2$ + 8 g/l urea |
| B | 2 | 0.48 | 227 g/l urea + pH 1.7 $HNO_3$ |
| C | 1 | 12.74 | Contents of Reactor #1 |
| D | 1 | 13.48 | Contents of Reactor #2 |

In Runs 4 and 5, the reactor system of FIG. 29 was used. In this system, a plug flow reactor was used for nucleation. In Run 4, nuclei of less than 1 μm were formed in the PFR (plug flow reactor, referred to in FIGS. 27–29 as "PFTR"), which grew larger in the CSTR (continuously stirred tank reactor). In Run 5, a longer residence time in the CSTR allowed the particles to grow to 4 μm.

| | | Run 4 (FIG. 29) | |
|---|---|---|---|
| Pump | Head | Flow Rate (ml/min) | Contents |
| A | 1 | 0.18 | 37% formaldehyde |
| A | 2 | 0.18 | 25% formaldehyde |
| B | 1 | 0.48 | 152.1 g/l urea + pH 1.7 $HNO_3$ |
| C | 1 | 26.04 | Contents of CSTR |
| E | 1 | 25.20 | 25% $ZrO_2$ sol + 4.35 g/l urea |

Note: The residence time of the PFR was 10 minutes, and that of the CSTR was 45 minutes.

Run 5 (FIG. 29)

For this run, 8 liters of diluted sol were made by adding 6 liters of pH 1.7 $HNO_3$ to two liters of pH adjusted sol (20% by weight) and homogenizing. Urea (34.8 grams) was then weighed and added to the diluted sol. The concentrated urea solution was made by dissolving 38.1 grams of urea in a minimum of pH 1.7 nitric acid. This was then transferred to a 250 ml volumetric flask and diluted to the mark with more pH 1.7 nitric acid. The 25% formaldehyde solution was made by weighing out 200 grams of 37% formaldehyde and adding 96 grams of deionized water.

All of the pumps were then calibrated with deionized water to determine settings for the desired flow rates. The CSTR (continuously stirred tank reactor) was initially filled with 1950 ml of diluted sol and then 5.66 grams of solid urea was added and dissolved. For the PFR plug flow reactor, 45.5 feet of 3/16 inch I.D. polypropylene tubing was measured out. Pump E and pump A were then attached to the end of the PFR tube. An in-line mixer approximately four inches long was installed in the PFR tube to insure homogenization of the sol and the formaldehyde.

Once all of the tubes were fastened to either the reaction beaker, or to the vessel the reactants were coming from, pumps A and C were turned on. After the contents of the PFR started flowing into the CSTR the remaining pumps were turned on. Samples of the reaction mixtures were taken every 15 minutes for the first two hours. The collection vessel was changed after one hour, two hours, and 2.5 hours. After 3.5 total hours of reaction time, the run was ended, and all of the pumps were shut off.

| Pump | Head | Flow Rate (ml/min) | Contents |
|---|---|---|---|
| A | 1 | 0.18 | 37% formaldehyde |
| A | 2 | 0.18 | 25% formaldehyde |
| B | 1 | 0.48 | 152.1 g/l urea + pH 1.7 $HNO_3$ |
| C | 1 | 26.04 | Contents of CSTR |
| E | 1 | 25.20 | 25% $ZrO_2$ sol + 4.35 g/l urea |

Figure 23:
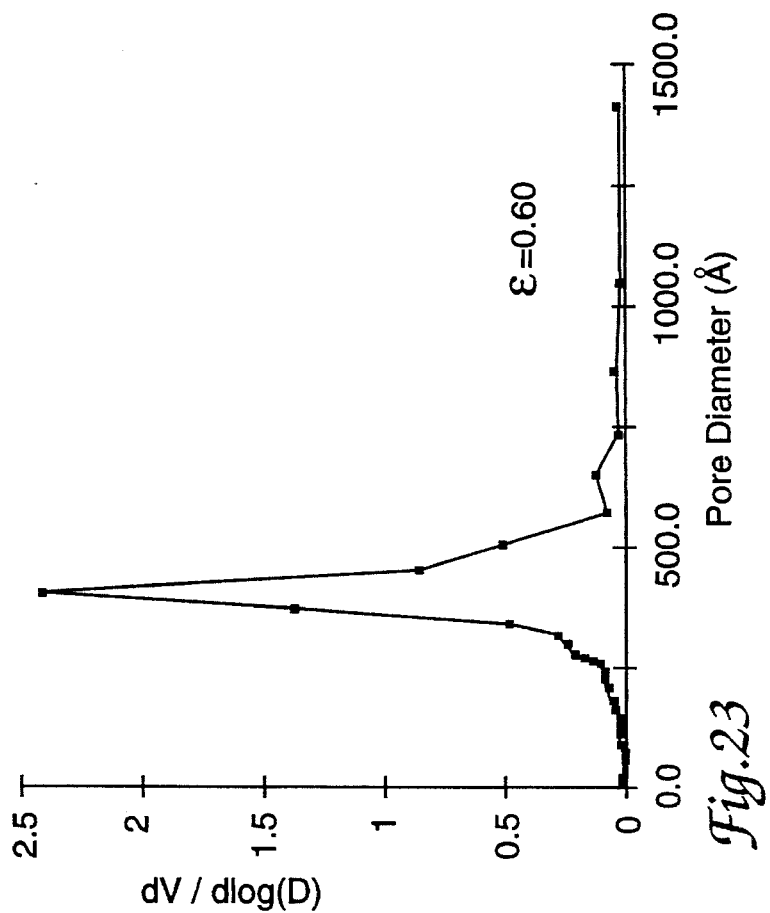
FIG. 23. Pore size distributions after sintering from nitrogen absorption for particles synthesized using a continuous flow process.

Note: The residence time of the PFR was 10 minutes, and that of the CSTR was 75 minutes. The polymer-containing aggregates contained about 50 wt-% polymer. The sintered particles produced had a diameter of 2–3 μm and a surface area of 42 m²/g. The pore size distribution is shown in FIG. 23 ($N_2$ adsorption peak).

EXAMPLE 6

Protein Separation

Figure 24:
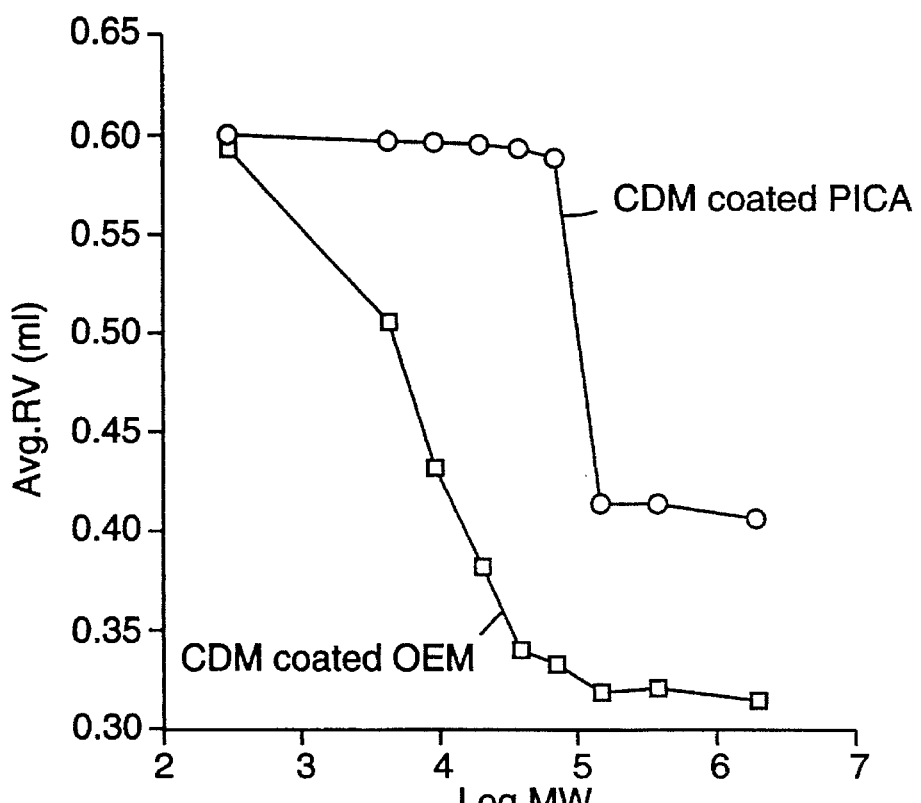
FIG. 24. Size exclusion chromatography curves for particles of the present invention (PICA) and conventional particles (OEM).

Zirconia materials prepared by the batch PICA process described above and by a variant of the oil emulsion process (OEM) described in U.S. Pat. No. 5,015,373 (P. W. Carr et at.) were pre-coated with dextran (MW 9300, Sigma Chemical) that had been carboxymethylated (5% substitution). These materials were then crosslinked with 1,4-butanediol diglycidyl ether (Aldrich Chemical Company). These materials were then challenged with polymeric solutes of varying molecular weights. The solutes were FITC-labeled dextrans (Sigma Chemical Co.) of the following molecular weights: 4300, 9300, 19600, 38900, 71200, 147800, 485000, and 2 million. The final solute was para-nitrophenylglucose (pnp-G) (Sigma Chemical Co.). Shown in FIG. 24 are typical size exclusion chromatography curves for both materials. The conditions in the figure are as follows: mobile phase-200 mM $K_2HPO_4$ at 0.5 ml/minute, UV detection at 280 nm. 15 μl of 1% solution of the probes was injected. Elution times were read from a digital integrator and converted to elution volumes.

The curves in FIG. 24 are remarkably different. Both materials appear to have the same total elution volume, as shown by the first point (pnp-G). However, the OEM material shows a decrease in the elution volume starting with the next solute which continues to a plateau at 0.3 ml. The PICA material, in contrast, has a plateau for the smaller solutes, then a sudden drop, followed by another plateau at 0.4 ml. These results show that the PICA materials have a much larger accessible volume for large solutes (up to approximately 100,000 MW) than the oil emulsion material.

Figure 25A:
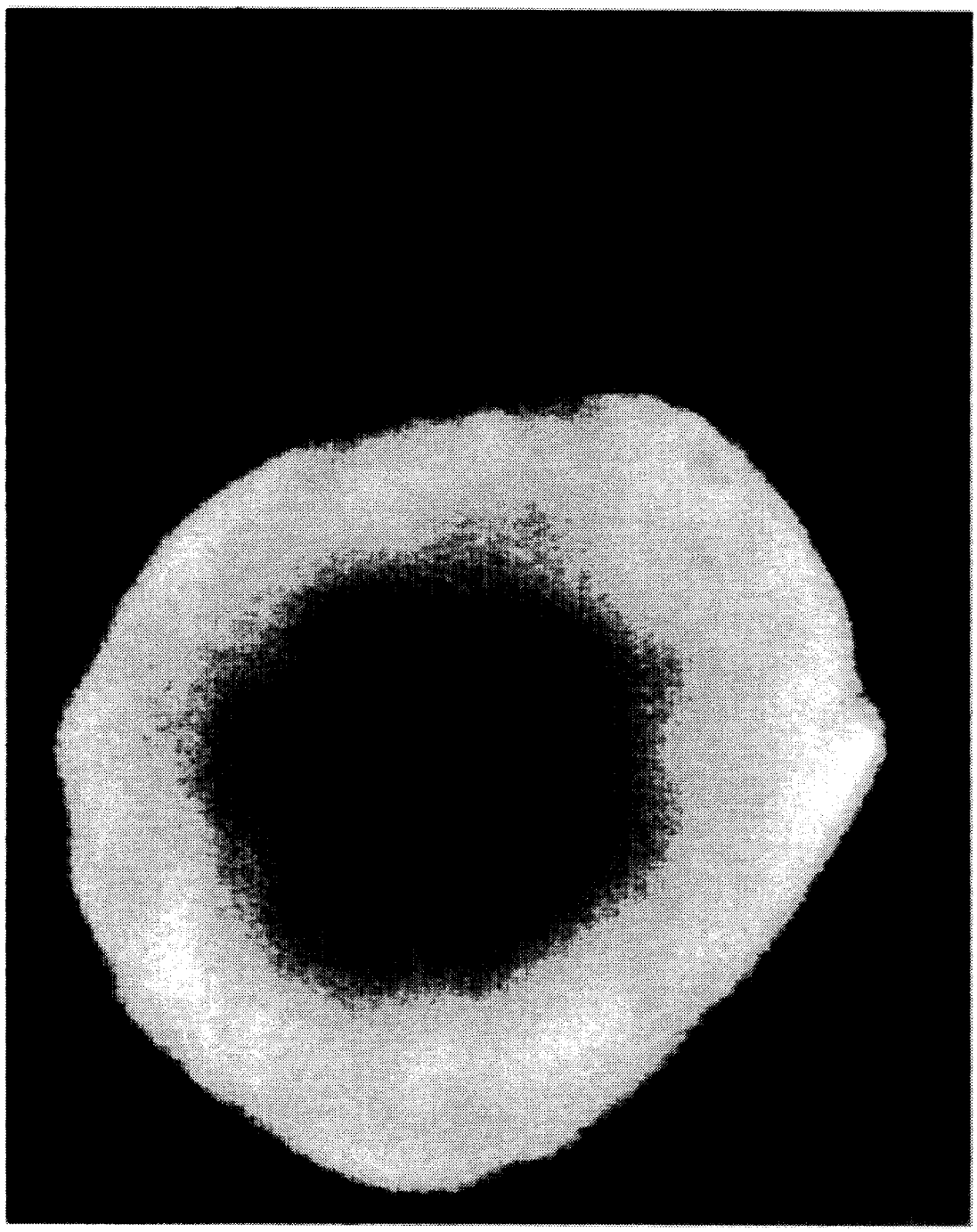
FIGS. 25A and 25B. A Scanning Fluorescence Microscope micrograph of sintered, porous $ZrO_2$ particles produced by a conventional method.
Figure 25B:
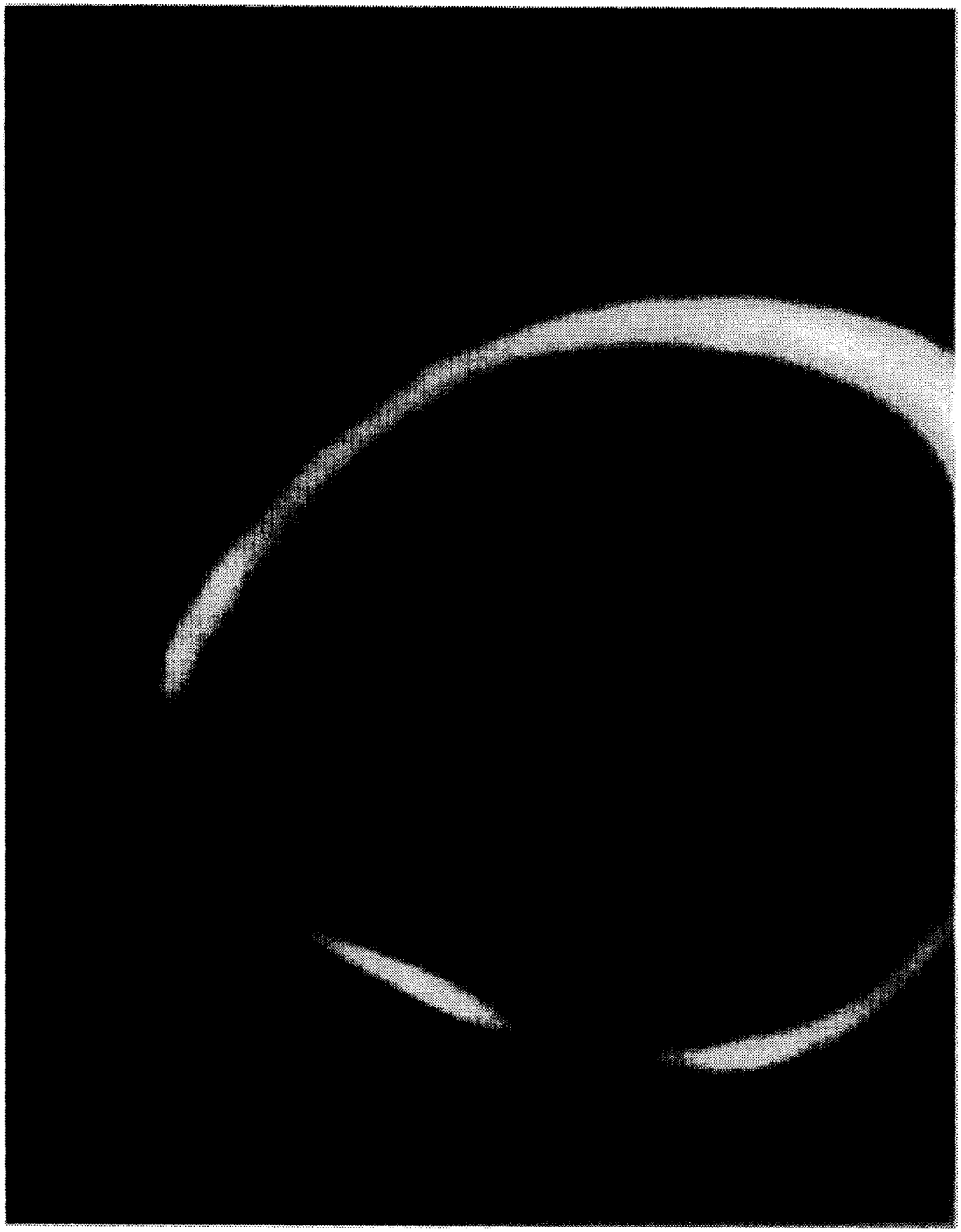
Figure 26A:
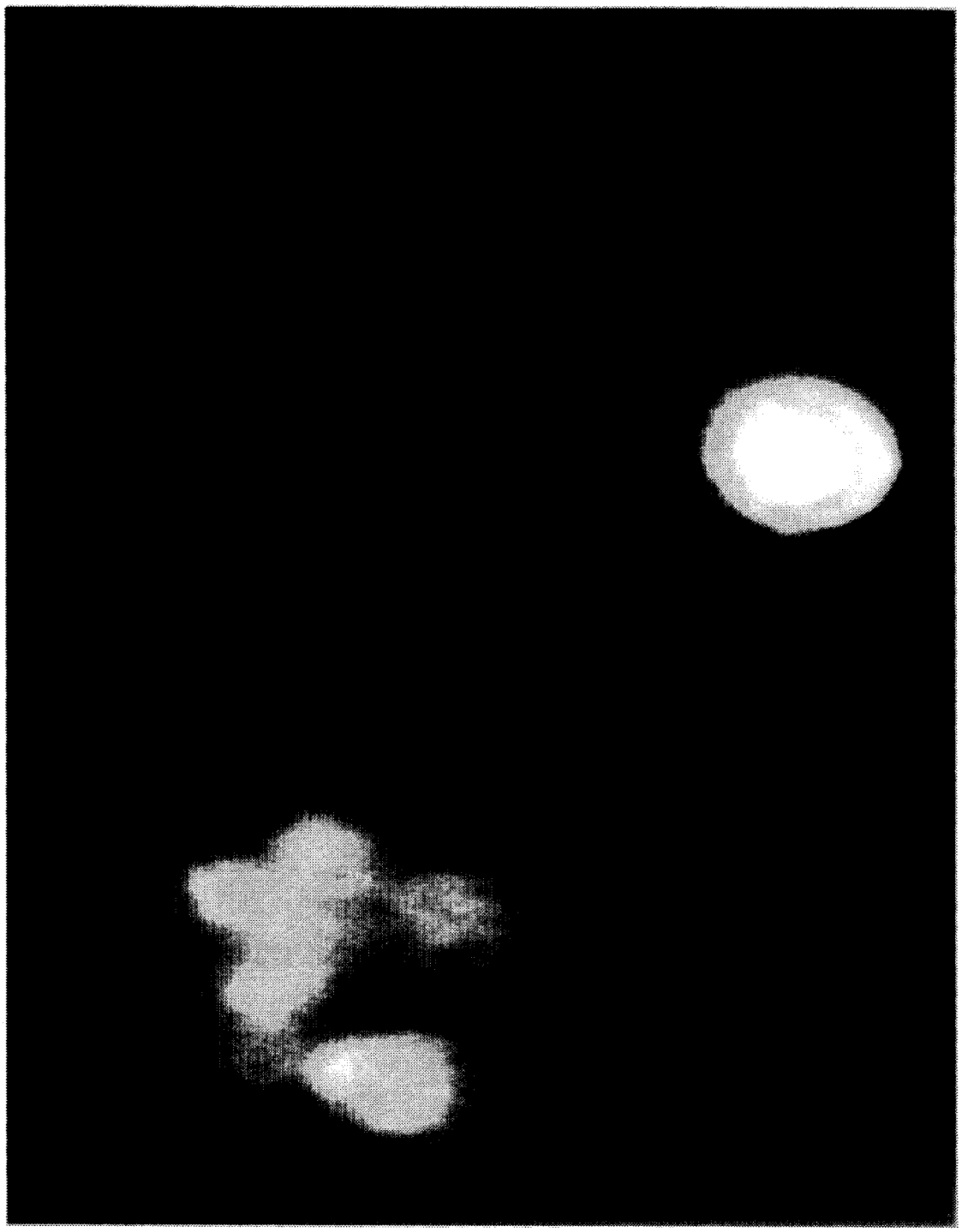
FIGS. 26A and 26B. A Scanning Fluorescence Microscope micrograph of sintered, porous $ZrO_2$ particles produced by the methods of the present invention.
Figure 26B:
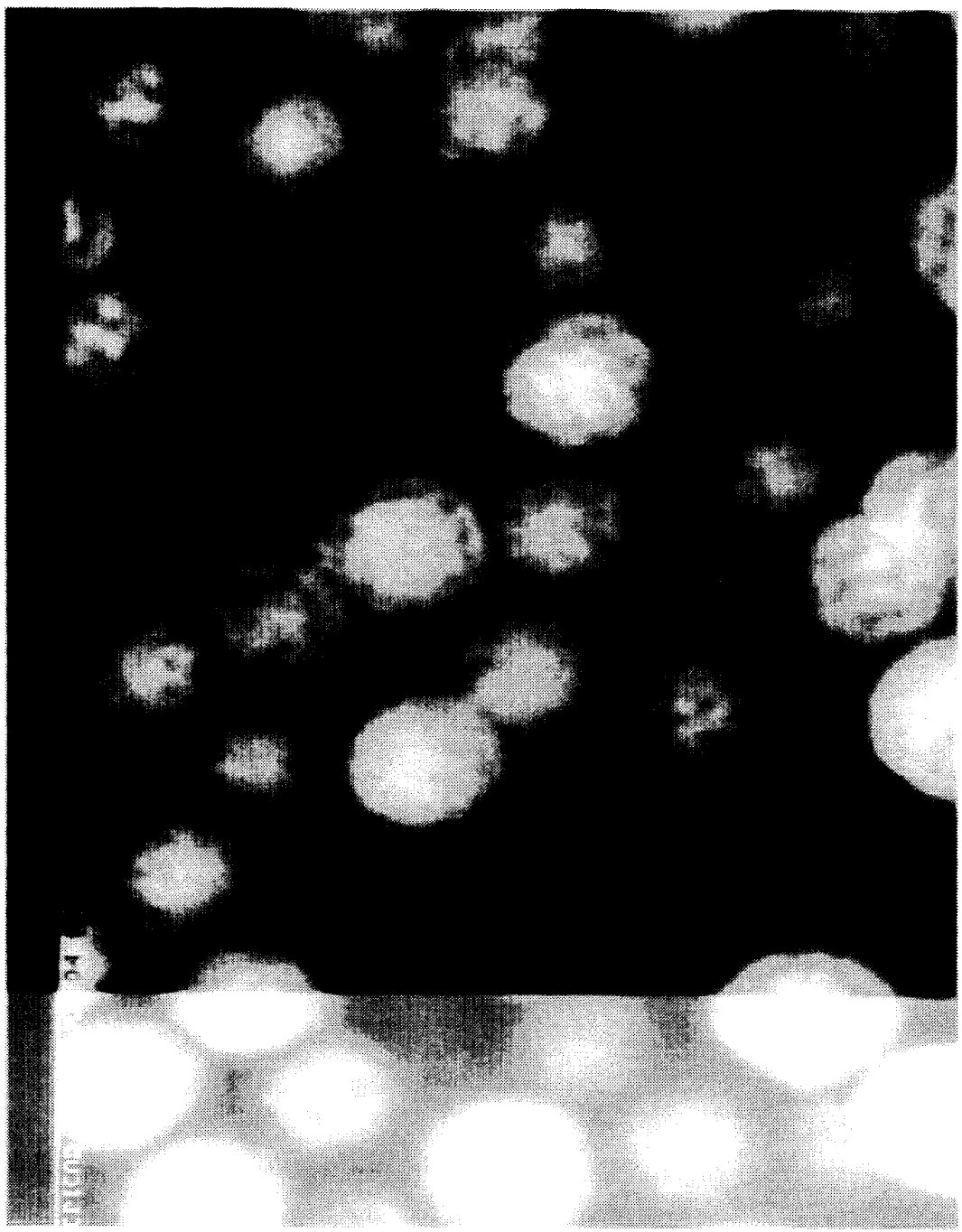

These results were confirmed by a different experiment. The uncoated materials were placed in a solution of the FITC-labeled dextrans. The zirconia materials were allowed to come to equilibrium with the solution. The particles were then imaged by confocal scanning fluorescence microscopy. The results are shown in FIGS. 25 and 26. The particles into which the labeled dextrans penetrated showed a uniform glow. Those into which the dextran did not penetrate showed a glowing halo. For the OEM particles (FIG. 25), partial exclusion of the polymer was seen starting with MW 38900 dextrans (FIG. 25A). The higher molecular weights are excluded from all but a thin shell near the surface (FIG. 25B). In contrast, the PICA particles showed no exclusion of the dextran probes (FIG. 26). FIGS. 26A and 26B show the images of PICA materials that had been challenged with 9300 and 2 million molecular weight dextrans respectively. This confirms the size exclusion chromatography results reported above that the PICA material have more accessible volume than the OEM materials.

The fact that the PICA $ZrO_2$ particles have a larger accessible volume than the OEM $ZrO_2$ particles becomes important chromatographically when macromolecules such as polymers and proteins are to be separated. If the particles used for chromatography have pores that are too small, large molecules of interest will not be separated. This is also very important in preparative scale chromatography, where the capacity of a column is related to how much of the internal volume of the particles of the molecules can access. Thus, zirconia particles prepared by the methods of the present invention are much better for biomolecule separations than the zirconia particles prepared by the oil emulsion method.

While this invention has been described in connection with specific embodiments, it should be understood that it is capable of further modification. The claims are intended to cover those variations which one skilled in the art would recognize as the chemical equivalent of what has been described herein. Thus, various omissions, modifications, and changes to the principles described herein can be made by one skilled in the art without departing from the true scope and spirit of the invention, which is indicated by the following claims.

What is claimed is:

1. A method for producing inorganic particles comprising:
   (a) combining an aqueous sol comprising a colloidal dispersion of inorganic particles with a polymerizable organic material;
   (b) polymerizing the organic material and forming aggregates of the polymer and inorganic colloidal particles;
   (c) collecting the aggregates and pretreating them in a generally oxygen-free atmosphere at a temperature and for a time effective to convert the polymer to a generally nonflowable state;
   (d) pyrolyzing the pretreated aggregates at a temperature of less than 550° C. in an oxygen atmosphere for a time effective to produce substantially polymer-free particles; and
   (e) sintering the substantially polymer-free particles at a temperature and for a time effective to increase their mechanical strength;
   wherein the resultant inorganic particles are monodisperse and have a porosity of about 5–60%.

2. The method of claim 1 wherein the inorganic particles are $ZrO_2$ particles.

3. The method of claim 2 wherein the step of pyrolyzing is carried out at a temperature of about 300°–400° C.

4. The method of claim 1 wherein the sintering step is a multistep sintering process.

5. The method of claim 4 wherein the multistep sintering process comprises heating the substantially polymer-free particles at a temperature of about 600°–800° C. for about 0.5–10 hours, and subsequently heating the particles at a temperature of about 800°–1000° C. for about 0.5–5 hours.

6. The method of claim 1 wherein the aqueous sol comprising a colloidal dispersion of inorganic particles includes a miscible organic solvent.

7. The method of claim 1 wherein the step of pretreating the aggregates is carried out at a temperature of about 100°–270° C. for at least about 6 hours.

8. The method of claim 1 wherein the step of polymerizing includes adjusting the temperature to about 5–50° C.

9. The method of claim 8 wherein the temperature is adjusted to about 15°–30° C.

10. The method of claim 1 wherein the step of polymerizing includes adjusting the pH to about 1–3.

11. A method for producing $ZrO_2$ particles comprising:
   (a) combining an aqueous sol comprising a colloidal dispersion of $ZrO_2$ particles with a polymerizable organic material;
   (b) polymerizing the organic material and forming aggregates of the polymer and $ZrO_2$ colloidal particles;
   (c) collecting the aggregates and pretreating them in a generally oxygen-free atmosphere at a temperature of about 100°–270° C. for a time effective to convert the polymer to a generally nonflowable state;
   (d) pyrolyzing the pretreated aggregates at a temperature of less than 550° C. in an oxygen atmosphere for a time effective to produce substantially polymer-free $ZrO_2$ particles; and
   (e) sintering the substantially polymer-free $ZrO_2$ particles by heating them in a first step at a temperature of about 600°–800° C. for about 0.5–10 hours, and subsequently heating the particles at a temperature of about 800°–1000° C. for about 0.5–5 hours;
   wherein the resultant $ZrO_2$ particles are monodisperse and have a porosity of about 5–60%.

12. The method of claim 11 wherein the aqueous sol comprising a colloidal dispersion of inorganic particles includes a miscible organic solvent.

13. The method of claim 11 wherein the step of polymerizing includes adjusting the temperature to about 5°–30° C.

14. The method of claim 13 wherein the step of polymerizing includes adjusting the pH to less than about 6.

15. The method of claim 11 wherein the step of polymerizing includes adjusting the pH to about 1–3.

16. A method for producing inorganic particles comprising:
   (a) combining an aqueous sol comprising a colloidal dispersion of inorganic particles with a polymerizable organic material in a continuous flow system;
   (b) polymerizing the organic material and forming aggregates of the polymer and inorganic colloidal particles;
   (c) collecting the aggregates and pretreating the aggregates of the polymer and inorganic colloidal particles in a generally oxygen-free atmosphere;
   (d) pyrolyzing the pretreated aggregates in an oxygen atmosphere; and
   (e) sintering the substantially polymer-free particles at a temperature and for a time effective to increase their mechanical strength.

17. The method of claim 16 wherein the resultant inorganic particles are monodisperse and have a porosity of about 5–60%.

18. The method of claim 16 wherein the continuous flow system comprises at least one plug flow reactor.

19. The method of claim 18 wherein the continuous flow system comprises at least one continuously stirred reactor.

20. The method of claim 16 wherein the continuous flow system comprises at least one continuously stirred reactor.

21. The method of claim 16 wherein the step of combining in a continuous flow system comprises:
   (a) combining the aqueous sol comprising a colloidal dispersion of inorganic particles and the polymerizable organic material in a first reactor in amounts effective to produce nuclei of polymer and inorganic colloidal particles in combination with unreacted colloidal particles; and
   (b) adding additional polymerizable organic material to the mixture of nuclei and unreacted colloidal particles in a second reactor to cause growth of the nuclei into aggregates without substantial additional nucleation.

22. The method of claim 21 wherein the nucleation occurs in a plug flow reactor and the growth occurs in a continuously stirred reactor.

* * * * *

UNITED STATES PATENT AND TRADEMARK OFFICE
CERTIFICATE OF CORRECTION

PATENT NO.: 5,540,834
DATED: July 30, 1996
INVENTOR(S): Peter W. Carr, et al.

It is certified that error appears in the above-identified patent and that said Letters Patent is hereby corrected as shown below:

Col. 12, line 26
"0.5°" should be --0.5--

Col. 19, line 40
"2.5≤pH≤3.0" should be --2.5≤pH≤3.0--

Col. 20, lines 55-56
"B. J. Kellett and F. F. Lange, *J. Amer. Ceram. Soc.*, 72 (5), 725 1989))." should be --(F. F. Lange, J. Amer. Ceram. Soc., 72(1), 843 (1989)).--

Col. 24, line 16
"reactor" should be --reactor 1--

Signed and Sealed this

Ninth Day of February, 1999

Attest:

Attesting Officer

*Acting Commissioner of Patents and Trademarks*